US012750792B2

(12) United States Patent
Cui et al.

(10) Patent No.: US 12,750,792 B2
(45) Date of Patent: Sep. 29, 2026

(54) POWER CONTROL METHOD, COMMUNICATION APPARATUS, AND COMMUNICATION SYSTEM

(71) Applicant: HUAWEI TECHNOLOGIES CO., LTD., Shenzhen (CN)

(72) Inventors: Jianming Cui, Shanghai (CN); Wei Chen, Shenzhen (CN); Zhe Wu, Shanghai (CN); Jian Zhang, Shanghai (CN); Zhihua Liu, Shenzhen (CN); Quan Zhou, Shenzhen (CN); Jing Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 18/746,058

(22) Filed: Jun. 18, 2024

(65) Prior Publication Data

US 2024/0340815 A1 Oct. 10, 2024

Related U.S. Application Data

(63) Continuation of application No. PCT/CN2022/142731, filed on Dec. 28, 2022.

(30) Foreign Application Priority Data

Jan. 4, 2022 (CN) ......................... 202210003272.1

(51) Int. Cl.
*H04W 52/42* (2009.01)
*H04W 72/044* (2023.01)

(52) U.S. Cl.
CPC ......... *H04W 52/42* (2013.01); *H04W 72/046* (2013.01)

(58) Field of Classification Search
CPC ............... H04W 52/42; H04W 72/046; H04W 52/243; H04W 52/24; H04W 52/0203; H04W 52/248
See application file for complete search history.

(56) References Cited

U.S. PATENT DOCUMENTS

2017/0105223 A1 4/2017 Zhang et al.
2018/0098289 A1 4/2018 Visotsky et al.
2019/0089473 A1 3/2019 Deng et al.
(Continued)

FOREIGN PATENT DOCUMENTS

CN 110971366 A * 4/2020 ............ H04W 72/23
JP 2004207839 A 7/2004
JP 2021510989 A 4/2021
(Continued)

*Primary Examiner* — Curtis A Kuntz

(57) ABSTRACT

Embodiments of this application provide a power control method, a communication apparatus, and a communication system. The method includes: determining whether a first condition is met, where the first condition includes that a time-frequency resource for sending a first beam and a time-frequency resource for sending a second beam overlap, a ratio of interference of the first beam to the second beam to noise floor of a receiver is greater than a first threshold, and a ratio of interference of the second beam to the first beam to the noise floor of the receiver is greater than the first threshold; and reducing transmit power of the first beam and transmit power of the second beam when the first condition is met.

16 Claims, 8 Drawing Sheets

(56) References Cited

U.S. PATENT DOCUMENTS

2022/0279458 A1* 9/2022 Shimizu .............. H04W 52/367

FOREIGN PATENT DOCUMENTS

| | | | | |
|---|---|---|---|---|
| WO | 2010110344 A1 | 9/2010 | | |
| WO | WO-2016024644 A1 * | 2/2016 | ............ | H04W 72/23 |
| WO | 2016054819 A1 | 4/2016 | | |
| WO | 2017167503 A1 | 10/2017 | | |
| WO | WO-2022155514 A1 * | 7/2022 | ......... | H04B 7/06964 |

* cited by examiner (a)

(b)

POWER CONTROL METHOD, COMMUNICATION APPARATUS, AND COMMUNICATION SYSTEM

CROSS-REFERENCE TO RELATED APPLICATIONS

This application is a continuation of International Application No. PCT/CN2022/142731, filed on Dec. 28, 2022, which claims priority to Chinese Patent Application No. 202210003272.1, filed on Jan. 4, 2022. The disclosures of the aforementioned applications are hereby incorporated by reference in their entireties.

TECHNICAL FIELD

This application relates to the field of communication technologies, and more specifically, to a power control method, a communication apparatus, and a communication system.

BACKGROUND

Currently, in a 4th generation communication system (4G) and a 5th generation communication system (5G), a downlink is usually planned based on full power. An increase in power leads to an increase in interference. To balance impact of the interference, an interfered party also increases power to resist the interference, and this further increases the interference. Finally, high power brings a small gain and low power utilization, but the high power leads to large power consumption. Therefore, how to reduce power consumption of a network device as much as possible while ensuring communication performance is an urgent problem to be resolved.

SUMMARY

Embodiments of this application provide a power control method, a communication apparatus, and a communication system, to reduce power consumption of a network device as much as possible while ensuring communication performance.

According to a first aspect, a communication method is provided, including:

a centralized control node determines whether a first condition is met, where the first condition is that there is an overlapping first time-frequency resource between a time-frequency resource used by a first network device to send a first beam and a time-frequency resource used by a second network device to send a second beam, a ratio of interference of the first beam to the second beam to noise floor of a receiver is greater than a first threshold, and a ratio of interference of the second beam to the first beam to the noise floor of the receiver is greater than the first threshold; and when the first condition is met, the centralized control node sends first indication information to the first network device, and sends second indication information to the second network device, where the first indication information indicates to reduce transmit power of the first beam on the first time-frequency resource, and the second indication information indicates to reduce transmit power of the second beam on the first time-frequency resource.

According to the method in this application, when the first condition is met, the centralized control node may separately indicate the first network device and the second network device to reduce beam transmit power, to achieve an energy saving objective. In addition, because both the first network device and the second network device reduce the beam transmit power, a signal to interference plus noise ratio does not change greatly, that is, communication performance of the network device basically does not deteriorate.

With reference to the first aspect, in some implementations of the first aspect, the method further includes:

the centralized control node determines whether a second condition is met, where the second condition is that a third network device sends a third beam on the first time-frequency resource, a ratio of interference of the first beam to the third beam to the noise floor of the receiver is greater than the first threshold, and a ratio of interference of the third beam to the first beam to the noise floor of the receiver is less than or equal to the first threshold; and when the second condition is met, the centralized control node sends third indication information to the third network device, where the third indication information indicates to reduce transmit power of the third beam on the first time-frequency resource.

According to a second aspect, a communication method is provided, including:

a centralized control node sends fourth indication information to a first network device, and sends fifth indication information to a second network device, where the fourth indication information indicates to reduce beam transmit power of the first network device, and the fifth indication information indicates to reduce beam transmit power of the second network device; the centralized control node determines whether a first condition is met, where the first condition is that there is an overlapping first time-frequency resource between a time-frequency resource used by the first network device to send a first beam and a time-frequency resource used by the second network device to send a second beam, a ratio of interference of the first beam to the second beam to noise floor of a receiver is greater than a first threshold, and a ratio of interference of the second beam to the first beam to the noise floor of the receiver is greater than the first threshold; and when the first condition is not met, the centralized control node sends sixth indication information to the first network device, and sends seventh indication information to the second network device, where the sixth indication information indicates to increase transmit power of the first beam, and the seventh indication information indicates to increase transmit power of the second beam.

According to the solution of this application, the centralized control node may first notify a network device to reduce the beam transmit power, and when the first condition is not met, notify the network device to increase the beam transmit power. In other words, when the first condition is met, the network device reduces the beam transmit power, to achieve an energy saving objective. In addition, because both the two network devices reduce the beam transmit power, a signal to interference plus noise ratio does not change greatly, that is, communication performance of the network device basically does not deteriorate.

With reference to the second aspect, in some implementations of the second aspect, the method further includes:

the centralized control node sends eighth indication information to a third network device, where the eighth indication information indicates to reduce beam transmit power of the third network device; the centralized control node determines whether a second condition is met, where the second condition is that the third network device sends a third beam on the first time-frequency resource, a ratio of interference of the first beam to the third beam to the noise floor of the receiver is greater than the first threshold, and a ratio of interference of the third beam to the first beam to the noise floor of the receiver is less than or equal to the first threshold; and when the second condition is not met, the centralized control node sends ninth indication information to the third network device, and the ninth indication information indicates to increase transmit power of the third beam.

With reference to the first aspect or the second aspect, in some implementations of the first aspect or the second aspect, that the second beam causes first interference to the first beam, a fourth beam sent by a fourth network device causes second interference to the first beam, a ratio of interference of the first beam to the fourth beam to the noise floor of the receiver is less than or equal to the first threshold, and the ratio of interference of the second beam to the first beam to the noise floor of the receiver is greater than the first threshold includes:

a ratio of the first interference to a sum of the noise floor of the receiver and the second interference is greater than the first threshold.

With reference to the first aspect or the second aspect, in some implementations of the first aspect or the second aspect, the method further includes:

the centralized control node receives first information from the first network device, where the first information indicates the time-frequency resource used by the first network device to send the first beam; and the centralized control node receives second information from the second network device, where the second information indicates the time-frequency resource used by the second network device to send the second beam.

With reference to the first aspect or the second aspect, in some implementations of the first aspect or the second aspect, the method further includes:

the centralized control node sends first configuration information to the first network device, where the first configuration information indicates the time-frequency resource used by the first network device to send the first beam; and the centralized control node sends second configuration information to the second network device, where the second configuration information indicates the time-frequency resource used by the second network device to send the second beam.

With reference to the first aspect or the second aspect, in some implementations of the first aspect or the second aspect, the method further includes:

the centralized control node determines a first reduction amplitude of the transmit power of the first beam on the first time-frequency resource and a second reduction amplitude of the transmit power of the second beam on the first time-frequency resource.

With reference to the first aspect or the second aspect, in some implementations of the first aspect or the second aspect, the first reduction amplitude is the same as the second reduction amplitude.

According to a third aspect, a communication method is provided, including:

a first network device receives first indication information from a centralized control node, where the first indication information indicates to reduce transmit power of a first beam on a first time-frequency resource; the first network device reduces the transmit power of the first beam on the first time-frequency resource based on the first indication information, where the first indication information is sent when a first condition is met; and the first condition is that there is an overlapping first time-frequency resource between a time-frequency resource used by the first network device to send the first beam and a time-frequency resource used by the second network device to send the second beam, a ratio of interference of the first beam to the second beam to noise floor of a receiver is greater than a first threshold, and a ratio of interference of the second beam to the first beam to the noise floor of the receiver is greater than the first threshold.

According to a fourth aspect, a communication method is provided, including:

a first network device receives fourth indication information from a centralized control node, where the fourth indication information indicates to reduce beam transmit power of the first network device; the first network device receives sixth indication information from the centralized control node, where the sixth indication information indicates to increase transmit power of a first beam, and the first network device increases the transmit power of the first beam based on the sixth indication information, where the sixth indication information is sent when a first condition is not met; and the first condition is that there is an overlapping first time-frequency resource between a time-frequency resource used by the first network device to send the first beam and a time-frequency resource used by the second network device to send a second beam, a ratio of interference of the first beam to the second beam to noise floor of a receiver is greater than a first threshold, and a ratio of interference of the second beam to the first beam to the noise floor of the receiver is greater than the first threshold.

With reference to the third aspect or the fourth aspect, in some implementations of the third aspect or the fourth aspect, the method further includes:

the first network device sends first information to the centralized control node, where the first information indicates the time-frequency resource used by the first network device to send the first beam.

With reference to the third aspect or the fourth aspect, in some implementations of the third aspect or the fourth aspect, the method further includes:

the first network device receives first configuration information from the centralized control node, where the first configuration information indicates the time-frequency resource used by the first network device to send the first beam.

According to a fifth aspect, a communication method is provided, including:

a first network device sends first information to a second network device, where the first information indicates a time-frequency resource used by the first network device to send a first beam; the first network device receives second information from the second network device, where the second information indicates a time-frequency resource used by the second network device to send a second beam; the first network device determines, based on the first information and the second information, whether a first condition is met, where the first condition is that there is an overlapping first time-frequency resource between the time-frequency resource for sending the first beam and the time-frequency resource for sending the second beam, a ratio of interference of the first beam to the second beam to noise floor of a receiver is greater than a first threshold, and a ratio of interference of the second beam to the first beam to the noise floor of the receiver is greater than the first threshold; and when the first condition is met, the first network device reduces transmit power of the first beam on the first time-frequency resource.

According to the method in this application, the first network device determines whether the first condition is met, and when the first condition is met, reduces beam transmit power to achieve an energy saving objective. Similarly, the second network device may alternatively determine whether the first condition is met, and when the first condition is met, reduce the beam transmit power, to achieve an energy saving objective. When both the two network devices reduce transmit power, communication performance of the two network devices basically does not deteriorate.

According to a sixth aspect, a communication method is provided, including:

a first network device reduces beam transmit power; the first network device sends first information to a second network device, where the first information indicates a time-frequency resource used by the first network device to send a first beam; the first network device receives second information from the second network device, where the second information indicates a time-frequency resource used by the second network device to send a second beam; the first network device determines, based on the first information and the second information, whether a first condition is met, where the first condition is that there is an overlapping first time-frequency resource between the time-frequency resource for sending the first beam and the time-frequency resource for sending the second beam, a ratio of interference of the first beam to the second beam to noise floor of a receiver is greater than a first threshold, and a ratio of interference of the second beam to the first beam to the noise floor of the receiver is greater than the first threshold; and when the first condition is not met, the first network device increases transmit power of the first beam.

According to the method in this application, the first network device may first reduce beam transmit power, then determine whether the first condition is met, and if the first condition is not met, increase the beam transmit power. Similarly, the second network device may first reduce the beam transmit power, then determine whether the first condition is met, and if the first condition is not met, increase the beam transmit power. In other words, when the first condition is met, both the two network devices reduce the beam transmit power, to achieve an energy saving objective, and communication performance of the two network devices basically does not deteriorate.

With reference to the fifth aspect or the sixth aspect, in some implementations of the fifth aspect or the sixth aspect, the method further includes:

that the first network device receives third information from a fourth network device, where the third information indicates a time-frequency resource used by the fourth network device to send a fourth beam, the second beam causes first interference to the first beam, the fourth beam causes second interference to the first beam, a ratio of interference of the first beam to the fourth beam to noise floor of a receiver is less than or equal to the first threshold, and a ratio of interference of the second beam to the first beam to the noise floor of the receiver is greater than the first threshold includes:

a ratio of the first interference to a sum of the noise floor of the receiver and the second interference is greater than the first threshold.

With reference to the fifth aspect or the sixth aspect, in some implementations of the fifth aspect or the sixth aspect, the time-frequency resource for sending the first beam includes a first time domain and a first proportion occupying a specific frequency domain, and the time-frequency resource for sending the second beam includes a second time domain and a second proportion occupying a specific frequency domain; and the determining whether the first condition is met includes:

when the first time domain and the second time domain overlap with each other, and both the first proportion and the second proportion are greater than a fourth threshold, the first network device determines that there is an overlapping first time-frequency resource between the time-frequency resource for sending the first beam and the time-frequency resource for sending the second beam.

According to a seventh aspect, a communication method is provided, including:

a network device determines whether a third condition is met, where the third condition is that there is an overlapping second time-frequency resource between a time-frequency resource for sending a fifth beam and a time-frequency resource for sending a sixth beam, a ratio of interference of the fifth beam to the sixth beam to noise floor of a receiver is greater than a fifth threshold, and a ratio of interference of the sixth beam to the fifth beam to the noise floor of the receiver is greater than the fifth threshold; and when the third condition is met, the network device reduces transmit power of the fifth beam and transmit power of the sixth beam on a second time-frequency resource.

With reference to the seventh aspect, in some implementations of the seventh aspect, a reduction amplitude of transmit power of the fifth beam is the same as a reduction amplitude of transmit power of the sixth beam.

According to an eighth aspect, a power control method is provided, where the method includes:

determining whether a first condition is met, where the first condition includes that a time-frequency resource for sending a first beam and a time-frequency resource for sending a second beam overlap, a ratio of interference of the first beam to the second beam to noise floor of a receiver is greater than a first threshold, and a ratio of interference of the second beam to the first beam to the noise floor of the receiver is greater than the first threshold; and reducing transmit power of the first beam and transmit power of the second beam when the first condition is met.

With reference to the eighth aspect, in some implementations of the eighth aspect, the method further includes:

determining whether a second condition is met, where the second condition includes that the time-frequency resource for sending the first beam and a time-frequency resource for sending a third beam overlap, and a ratio of interference of the first beam to the third beam to the noise floor of the receiver is greater than the first threshold; and when the second condition is met, reducing transmit power of the third beam.

With reference to the eighth aspect, in some implementations of the eighth aspect, the method is applicable to a system including a first network device, a second network device, and a third network device, the first network device is configured to send the first beam, the second network device is configured to send the second beam, and the third network device is configured to send the third beam.

With reference to the eighth aspect, in some implementations of the eighth aspect, the determining whether a first condition is met includes:

the first network device and the second network device determine whether the first condition is met.

The reducing transmit power of the first beam and transmit power of the second beam when the first condition is met includes:

when the first condition is met, the first network device reduces the transmit power of the first beam, and the second network device reduces the transmit power of the second beam.

With reference to the eighth aspect, in some implementations of the eighth aspect, that the first network device and the second network device determine whether the first condition is met includes:

the first network device sends first information to the second network device, where the first information includes the time-frequency resource used by the first network device to send the first beam, and the interference of the second beam to the first beam; the second network device sends second information to the first network device, where the second information includes the time-frequency resource used by the second network device to send the second beam, and the interference of the first beam to the second beam; and the first network device determines, based on the first information and the second information, whether the first condition is met.

With reference to the eighth aspect, in some implementations of the eighth aspect, the determining whether a second condition is met includes:

the third network device determines whether the second condition is met; and the reducing transmit power of the third beam when the second condition is met includes:

when the second condition is met, the third network device reduces the transmit power of the third beam.

With reference to the eighth aspect, in some implementations of the eighth aspect, the method is applicable to a system including a centralized control node, a first network device, a second network device, and a third network device, the centralized control node is configured to manage the first network device, the second network device, and the third network device, the first network device is configured to send the first beam, the second network device is configured to send the second beam, and the third network device is configured to send the third beam.

With reference to the eighth aspect, in some implementations of the eighth aspect, the determining whether a first condition is met includes:

the centralized control node determines whether the first condition is met; and the reducing transmit power of the first beam and transmit power of the second beam when the first condition is met includes:

when the first condition is met, the centralized control node sends first indication information to the first network device, and sends second indication information to the second network device, where the first indication information indicates to reduce the transmit power of the first beam, and the second indication information indicates to reduce the transmit power of the second beam.

With reference to the eighth aspect, in some implementations of the eighth aspect, the determining whether a second condition is met includes:

the centralized control node determines whether the second condition is met; and the reducing transmit power of the third beam when the second condition is met includes:

when the second condition is met, the centralized control node sends third indication information to the third network device, where the third indication information indicates to reduce the transmit power of the third beam.

With reference to the eighth aspect, in some implementations of the eighth aspect, a reduction amplitude of the transmit power of the first beam is the same as a reduction amplitude of the transmit power of the second beam.

According to a ninth aspect, a centralized control node is provided, including:

a transceiver unit, and a processing unit connected to the transceiver unit; and the processing unit, configured to determine whether a first condition is met.

The first condition is that there is an overlapping first time-frequency resource between a time-frequency resource used by a first network device to send a first beam and a time-frequency resource used by a second network device to send a second beam, a ratio of interference of the first beam to the second beam to noise floor of a receiver is greater than a first threshold, and a ratio of interference of the second beam to the first beam to the noise floor of the receiver is greater than the first threshold.

When the first condition is met, the transceiver unit is configured to: send first indication information to the first network device, and send second indication information to the second network device, where the first indication information indicates to reduce transmit power of the first beam on the first time-frequency resource, and the second indication information indicates to reduce transmit power of the second beam on the first time-frequency resource.

With reference to the ninth aspect, in some implementations of the ninth aspect, the processing unit is further configured to determine whether a second condition is met.

The second condition is that a third network device sends a third beam on the first time-frequency resource, a ratio of interference of the first beam to the third beam to the noise floor of the receiver is greater than the first threshold, and a ratio of interference of the third beam to the first beam to the noise floor of the receiver is less than or equal to the first threshold.

When the second condition is met, the transceiver unit is further configured to send third indication information to the third network device, where the third indication information indicates to reduce transmit power of the third beam on the first time-frequency resource.

According to a tenth aspect, a centralized control node is provided, including:

a transceiver unit, and a processing unit connected to the transceiver unit;

the transceiver unit is configured to: send fourth indication information to a first network device, and send fifth indication information to a second network device;

the fourth indication information indicates to reduce beam transmit power of the first network device, and the fifth indication information indicates to reduce beam transmit power of the second network device; and the processing unit is configured to determine whether a first condition is met.

The first condition is that there is an overlapping first time-frequency resource between a time-frequency resource used by a first network device to send a first beam and a time-frequency resource used by a second network device to send a second beam, a ratio of interference of the first beam to the second beam to noise floor of a receiver is greater than a first threshold, and a ratio of interference of the second beam to the first beam to the noise floor of the receiver is greater than the first threshold.

When the first condition is not met, the transceiver unit is configured to: send sixth indication information to the first network device, and send seventh indication information to the second network device.

The sixth indication information indicates to increase transmit power of the first beam, and the seventh indication information indicates to increase transmit power of the second beam.

With reference to the tenth aspect, in some implementations of the tenth aspect, the transceiver unit is further configured to send eighth indication information to a third network device, where the eighth indication information indicates to reduce beam transmit power of the third network device; and the processing unit is further configured to determine whether a second condition is met.

The second condition is that a third network device sends a third beam on the first time-frequency resource, a ratio of interference of the first beam to the third beam to the noise floor of the receiver is greater than the first threshold, and a ratio of interference of the third beam to the first beam to the noise floor of the receiver is less than or equal to the first threshold.

When the second condition is not met, the transceiver unit is further configured to send ninth indication information to the third network device, where the ninth indication information indicates to increase transmit power of the third beam.

With reference to the ninth aspect or the tenth aspect, in some implementations of the ninth aspect or the tenth aspect, the transceiver unit is further configured to receive first information from the first network device, where the first information indicates the time-frequency resource used by the first network device to send the first beam; and the transceiver unit is further configured to receive second information from the second network device, where the second information indicates the time-frequency resource used by the second network device to send the second beam.

With reference to the ninth aspect or the tenth aspect, in some implementations of the ninth aspect or the tenth aspect, the transceiver unit is further configured to send, to the first network device, first configuration information for transmitting first downlink data, where the first configuration information indicates the time-frequency resource used by the first network device to send the first beam; and the transceiver unit is further configured to send, to the second network device, second configuration information for transmitting second downlink data, where the second configuration information indicates the time-frequency resource used by the second network device to send the second beam.

With reference to the ninth aspect or the tenth aspect, in some implementations of the ninth aspect or the tenth aspect, the processing unit is configured to determine a first reduction amplitude of the transmit power of the first beam on the first time-frequency resource and a second reduction amplitude of the transmit power of the second beam on the first time-frequency resource.

According to an eleventh aspect, a first network device is provided and includes:

a transceiver unit, and a processing unit connected to the transceiver unit;

the transceiver unit is configured to receive first indication information from a centralized control node, where the first indication information indicates to reduce transmit power of a first beam on a first time-frequency resource; and the processing unit is configured to reduce the transmit power of the first beam on the first time-frequency resource based on the first indication information.

According to a twelfth aspect, a first network device is provided and includes:

a transceiver unit, and a processing unit connected to the transceiver unit;

the transceiver unit is configured to receive fourth indication information from a centralized control node, where the fourth indication information indicates to reduce beam transmit power of the first network device;

the transceiver unit is further configured to receive sixth indication information from the centralized control node, where the sixth indication information indicates to increase transmit power of the first beam; and the processing unit is further configured to increase the transmit power of the first beam based on the sixth indication information.

With reference to the eleventh aspect or the twelfth aspect, in some implementations of the eleventh aspect or the twelfth aspect, the transceiver unit is further configured to send first information to the centralized control node, where the first information indicates the time-frequency resource used by the first network device to send the first beam.

With reference to the eleventh aspect or the twelfth aspect, in some implementations of the eleventh aspect or the twelfth aspect, the transceiver unit is further configured to receive first configuration information from the centralized control node, where the first configuration information indicates the time-frequency resource used by the first network device to send the first beam.

According to a thirteenth aspect, a first network device is provided and includes:

a transceiver unit, and a processing unit connected to the transceiver unit;

the transceiver unit is configured to send first information to a second network device, where the first information indicates a time-frequency resource used by the first network device to send a first beam;

the transceiver unit is further configured to receive second information from the second network device, where the second information indicates a time-frequency resource used by the second network device to send a second beam; and the processing unit is configured to determine, based on the first information and the second information, whether a first condition is met.

The first condition is that there is an overlapping first time-frequency resource between a time-frequency resource for sending the first beam and a time-frequency resource for sending the second beam, a ratio of interference of the first beam to the second beam to noise floor of a receiver is greater than a first threshold, and a ratio of interference of the second beam to the first beam to the noise floor of the receiver is greater than the first threshold.

When the first condition is met, the processing unit is further configured to reduce transmit power of the first beam on the first time-frequency resource.

According to a fourteenth aspect, a first network device is provided and includes:

a transceiver unit, and a processing unit connected to the transceiver unit;

the processing unit is configured to reduce transmit power of a beam;

the transceiver unit is configured to send first information to a second network device, where the first information indicates a time-frequency resource used by the first network device to send a first beam;

the transceiver unit is further configured to receive second information from the second network device, where the second information indicates a time-frequency resource used by the second network device to send a second beam; and the processing unit is further configured to determine, based on the first information and the second information, whether a first condition is met.

The first condition is that there is an overlapping first time-frequency resource between a time-frequency resource for sending the first beam and a time-frequency resource for sending the second beam, a ratio of interference of the first beam to the second beam to noise floor of a receiver is greater than a first threshold, and a ratio of interference of the second beam to the first beam to the noise floor of the receiver is greater than the first threshold.

When the first condition is not met, the processing unit is further configured to increase transmit power of the first beam.

With reference to the thirteenth aspect or the fourteenth aspect, in some implementations of the thirteenth aspect or the fourteenth aspect, the transceiver unit is further configured to receive third information from a fourth network device, where the third information indicates a time-frequency resource used by the fourth network device to send a fourth beam.

That the second beam causes first interference to the first beam, the fourth beam causes second interference to the first beam, a ratio of interference of the first beam to the fourth beam to the noise floor of the receiver is less than or equal to the first threshold, and a ratio of interference of the second beam to the first beam to the noise floor of the receiver is greater than the first threshold includes:

a ratio of the first interference to a sum of the noise floor of the receiver and the second interference is greater than the first threshold.

With reference to the thirteenth aspect or the fourteenth aspect, in some implementations of the thirteenth aspect or the fourteenth aspect, the time-frequency resource for sending the first beam includes a first time domain and a first proportion occupying a specific frequency domain, and the time-frequency resource for sending the second beam includes a second time domain and a second proportion occupying a specific frequency domain; and when the first time domain and the second time domain overlap with each other, and both the first proportion and the second proportion are greater than a fourth threshold, the processing unit determines that there is an overlapping first time-frequency resource between the time-frequency resource for sending the first beam and the time-frequency resource for sending the second beam.

According to a fifteenth aspect, a network device is provided and includes:

a transceiver unit, and a processing unit connected to the transceiver unit; and the processing unit is configured to determine whether a third condition is met.

The third condition is that there is an overlapping second time-frequency resource between a time-frequency resource for sending a fifth beam and a time-frequency resource for sending a sixth beam, a ratio of interference of the fifth beam to the sixth beam to noise floor of a receiver is greater than a fifth threshold, and a ratio of interference of the sixth beam to the fifth beam to the noise floor of the receiver is greater than the fifth threshold.

When the third condition is met, the processing unit is further configured to reduce transmit power of the fifth beam and transmit power of the sixth beam on a second time-frequency resource.

According to a sixteenth aspect, a communication device is provided, including a communication interface and a processor. When the communication device runs, the processor executes a computer program or instructions stored in a memory, so that the communication device performs the method according to any possible implementation in the first aspect to the seventh aspect. The memory may be located in the processor, or may be implemented by using a chip independent of the processor. This is not specifically limited in this application.

According to a seventeenth aspect, a computer-readable storage medium is provided. The computer-readable storage medium includes a computer program. When the computer program is run on a computer, the computer is enabled to perform the method according to any possible implementation of the first aspect to the seventh aspect.

According to an eighteenth aspect, a chip is provided. A processing circuit is disposed on the chip, and the processing circuit is configured to perform the method according to any possible implementation of the first aspect to the seventh aspect.

According to a nineteenth aspect, a computer program product is provided. The computer program product includes a computer program (or may be referred to as code or instructions). When the computer program is run, the computer is enabled to perform the method according to any possible implementation of the first aspect to the seventh aspect.

According to a twentieth aspect, a communication system is provided, including a first network device and a second network device. The first network device and the second network device are configured to perform the method according to the eighth aspect. Optionally, the communication system may further include a third network device.

According to a twenty-first aspect, a communication system is provided, including a centralized control node, a first network device, a second network device, and a third network device, where the centralized control node is configured to perform the method according to the eighth aspect.

DESCRIPTION OF EMBODIMENTS

Figure 1:
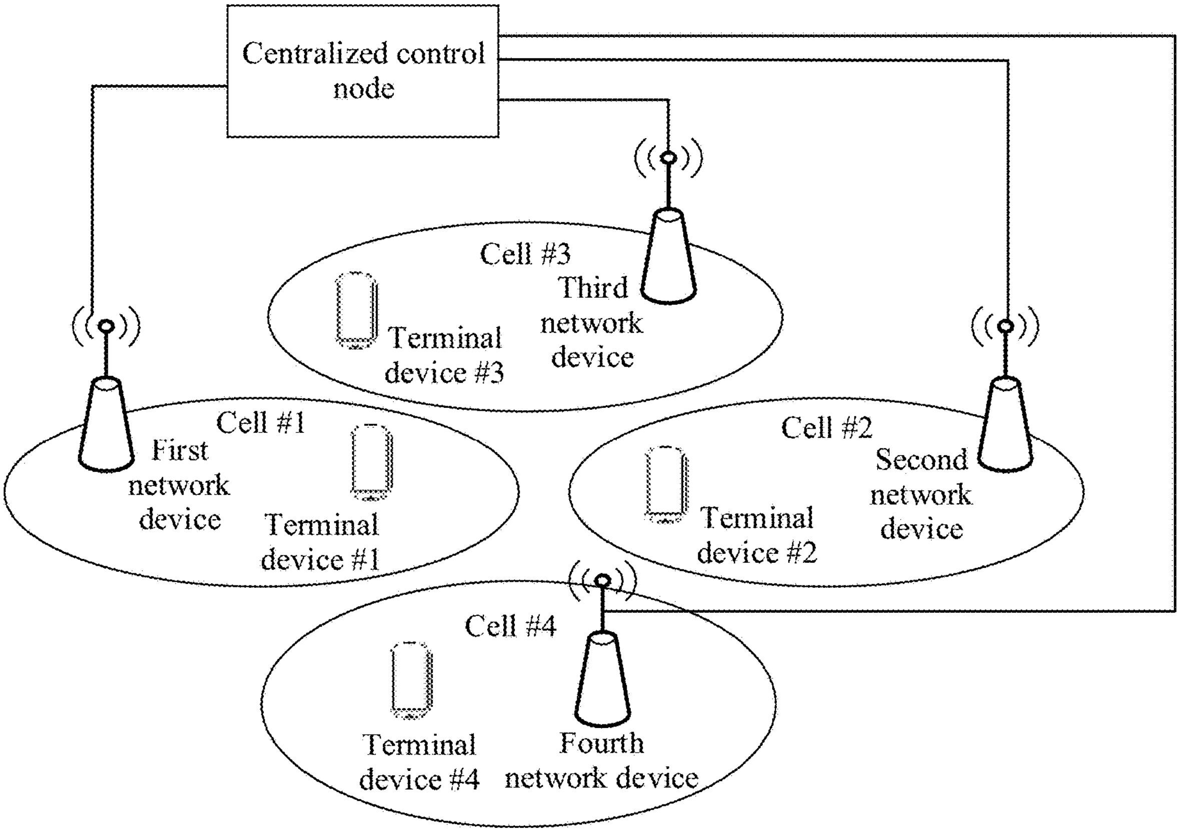
FIG. 1 shows a system architecture to which an embodiment of this application is applicable.
Figure 1:
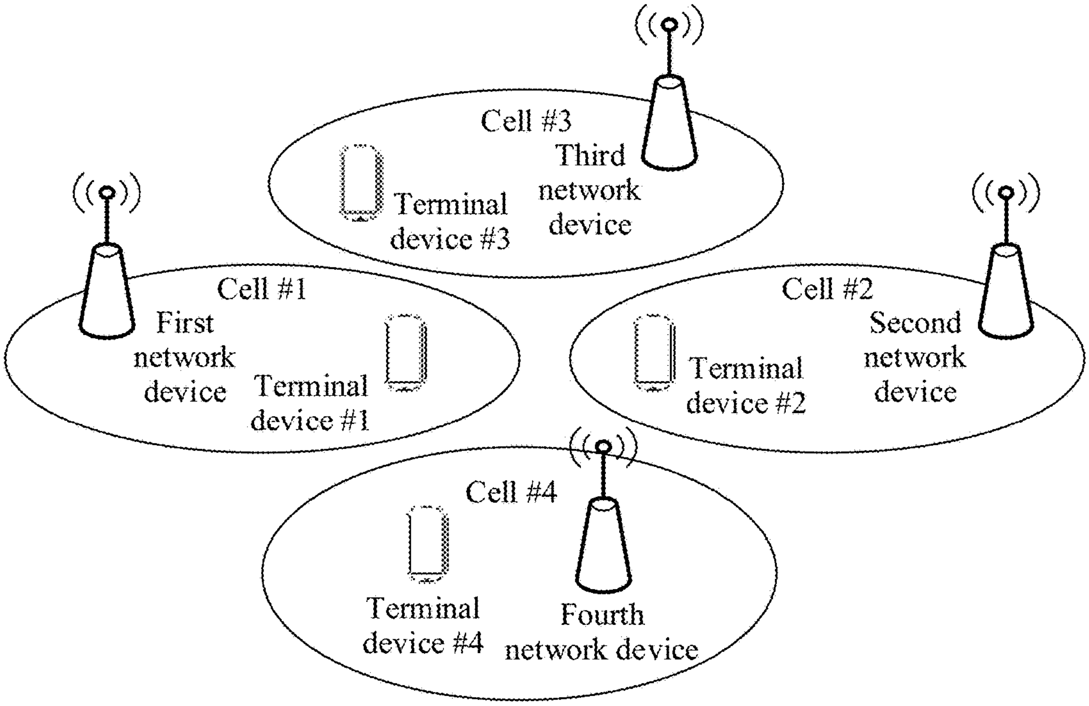

The following describes technical solutions in embodiments of this application with reference to accompanying drawings.

The technical solutions in embodiments of this application may be applied to various communication systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, a new radio (NR) system, a future 6th generation (6G) system, or the like.

For ease of understanding, some terms in this application are first described.

(1) Terminal Device

The terminal device in embodiments of this application may be user equipment (user equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future 6G network, or a terminal device in a future evolved public land mobile network (PLMN). This is not limited in embodiments of this application.

(2) Network Device

The network device in embodiments of this application may be a device configured to communicate with the terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNB or eNodeB) in the LTE system, or may be a radio controller in a scenario of a cloud radio access network (CRAN). Alternatively, the network device may be a relay station, an access point, a vehicle-mounted device, a wearable device, a network device in the 5G network, a network device in the future 6G network, a network device in a future evolved PLMN network, or the like. This is not limited in embodiments of this application.

(3) Interference Coordinating Cell Group

Two cells are used as an example. The two cells may be managed by a same network device, or may be managed by different network devices. For example, a network device #1 manages a cell #1, and a network device #2 manages a cell #2.

The network device #2 may broadcast a reference signal, and a plurality of terminal devices in the cell #1 may receive the reference signal broadcast by the network device #2, and perform measurement to obtain a measurement result. For example, the measurement result may be reference signal received power (RSRP). The plurality of terminal devices in the cell #1 separately feeds back measurement results to the network device #1. In addition, the network device #2 may send a load of the cell #2 to the network device #1. The network device #1 determines, based on the measurement results fed back by the plurality of terminal devices and the load of the cell #2, whether the cell #2 is a strong-interference neighboring cell of the cell #1.

Similarly, the network device #2 may alternatively determine whether the cell #1 is a strong-interference neighboring cell of the cell #2.

If the cell #1 is the strong-interference neighboring cell of the cell #2 and the cell #2 is the strong-interference neighboring cell of the cell #1, the cell #1 and the cell #2 are mutually interference coordinating cells.

The interference coordinating cell group may include a plurality of cells, and any two cells in the plurality of cells are mutually interference coordinating cells.

(4) Interference Beam Pair

The interference beam pair may be understood as beams that interfere with each other.

For example, in a possible case, a process of determining the interference beam pair in the two cells may include the following steps.

For example, the network device #1 manages the cell #1, the network device #2 manages the cell #2, and a terminal device #1 is located in the cell #1.

Step 1: The terminal device #1 sends a reference signal. Correspondingly, the network device #1 receives the reference signal on a plurality of beams. The network device #2 receives the reference signal on the plurality of beams.

Step 2: The network device #1 measures the reference signal received on the plurality of beams, to obtain a measurement result. The network device #2 measures the reference signal received on the plurality of beams, to obtain a measurement result.

Step 3: The network device #2 sends the obtained measurement result and beam information to the network device #1.

Step 4: The network device #1 determines the interference beam pair based on a measurement result of the network device #1 and a measurement result of the network device #2.

(5) Centralized Control Node

The centralized control node may be configured to manage a network device (for example, a base station). The centralized control node may also be referred to as a base station control node. For example, the centralized control node may be a baseband unit (BBU).

(6) Signal to Interference Plus Noise Ratio (SINR)

The signal to interference plus noise ratio is a main technical indicator for measuring communication quality of a communication system. Generally, a larger signal to interference plus noise ratio indicates better communication quality.

$$SINR = \frac{S}{I + N},$$

where S represents a signal, I represents interference, and N represents noise.

(7) Neighboring Cell Interference

For example, the cell #1 is adjacent to the cell #2, and interference of the cell #2 to the cell #1 is neighboring cell interference received by the cell #1.

(8) Inter-Stream Interference

In embodiments of this application, the inter-stream interference may be understood as interference between different data streams.

In a process in which a network device communicates with a terminal device, interference may exist between a plurality of beams sent by the network device. For example, interference exists between a beam #1 sent by the network device #1 and a beam #2 sent by the network device #2. For another example, interference exists between two beams (a beam #A and a beam #B) sent by the network device #1. To reduce impact of the interference on communication, the network device increases power of a transmit beam. However, increasing the power of the transmit beam further increases interference between beams. Finally, a large part of the power of the transmit beam of the network device is used to resist the interference, and power utilization is not high.

Based on this, this application provides a plurality of methods, to reduce power consumption of the network device as much as possible while ensuring communication performance.

It should be understood that the network device or the centralized control node in this application may be a module or a baseband unit located in the baseband unit. This is not limited in this application.

(a) in FIG. 1 shows a communication system. The communication system includes a centralized control node, a cell #1, a cell #2, a cell #3, and a cell #4. The four cells may be managed by a same network device, or may be managed by a plurality of network devices. In addition, the cell #1 and the cell #2 are mutually interference coordinating cells. The cell #2, the cell #3, and the cell #4 are all neighboring cells of the cell #1. The communication system may also be referred to as a centralized communication system.

For ease of description, an example in which a first network device manages the cell #1, a second network device manages the cell #2, a third network device manages the cell #3, and a fourth network device manages the cell #4 is used for description in the following. In addition, the centralized control node manages the four network devices.

The first network device is configured to send a first beam to a terminal device #1 in the cell #1, the second network device is configured to send a second beam to a terminal device #2 in the cell #2, the third network device is configured to send a third beam to a terminal device #3 in the cell #3, and the fourth network device is configured to send a fourth beam to a terminal device #4 in the cell #4.

(b) in FIG. 1 shows another communication system. Compared with that in (a) in FIG. 1, the communication system does not include a centralized control node. The communication system may also be referred to as a distributed communication system.

Figure 2:
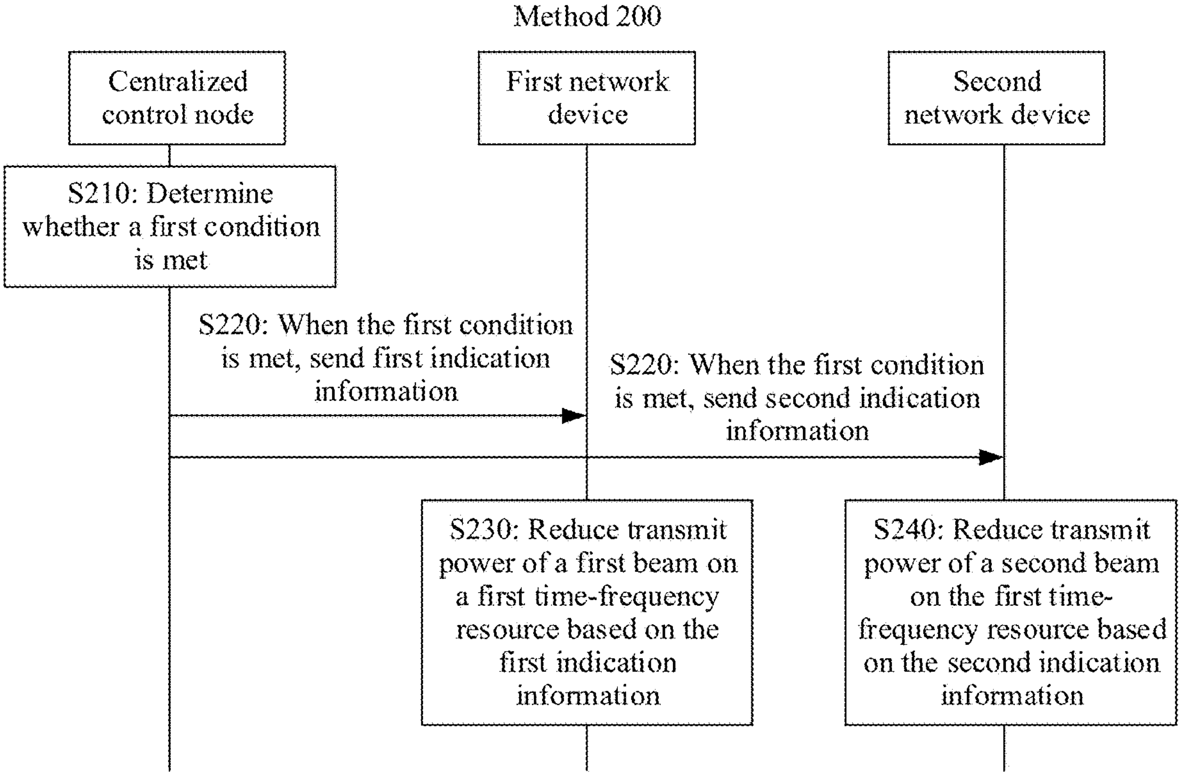
FIG. 2 is an interaction diagram of an example of a method according to this application.

FIG. 2 shows a method 200 according to this application. The method 200 is applicable to the communication system shown in (a) in FIG. 1. Specifically, the method 200 includes the following steps.

S210: A centralized control node determines whether a first condition is met.

The first condition is that there is an overlapping first time-frequency resource between a time-frequency resource used by a first network device to send a first beam and a time-frequency resource used by a second network device to send a second beam, a ratio of interference of the first beam to the second beam to noise floor of a receiver is greater than a first threshold, and a ratio of interference of the second beam to the first beam to the noise floor of the receiver is greater than the first threshold.

It may be understood that the noise floor of the receiver may also be referred to as noise floor of a terminal or noise floor of a terminal device. Factors that affect the noise floor of the terminal include thermal noise and a noise factor. For different terminal devices, the noise floor of the terminal may be the same, or may be different.

It should be understood that the first network device sends the first beam to perform first downlink data transmission with a terminal device #1, and the second network device sends the second beam to perform second downlink data transmission with a terminal device #2.

Figure 3:
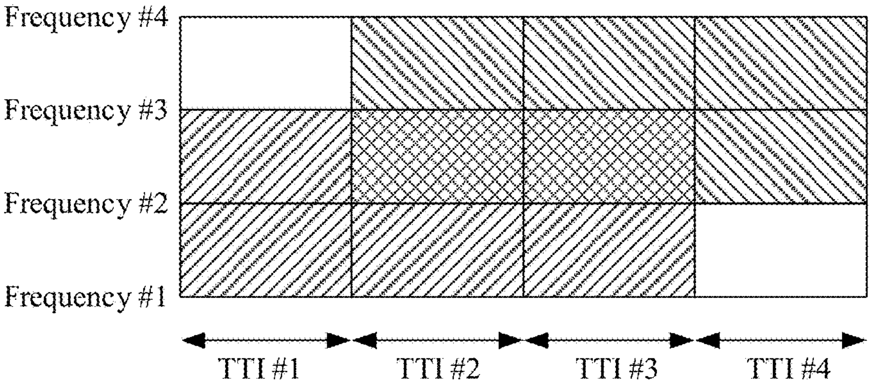
FIG. 3 shows a time-frequency resource for sending a first beam and a time-frequency resource for sending a second beam.

For example, as shown in FIG. 3, the time-frequency resource for sending the first beam is a transmission time interval (TTI) #1 to a TTI #3 in time domain and is a frequency #1 to a frequency #3 in frequency domain, and the time-frequency resource for sending the second beam is a TTI #2 to a TTI #4 in time domain and is a frequency #2 to a frequency #4 in frequency domain. In this case, the overlapping first time-frequency resource is the TTI #2 and the TTI #3 in time domain and is the frequency #2 and the frequency #3 in frequency domain.

Optionally, in a possible case, the centralized control node may obtain a magnitude of interference of the first beam to the second beam according to the following steps.

Step 1: The first network device broadcasts a reference signal at preset power.

Step 2: A terminal device #2 in a cell #2 receives the reference signal broadcast by the first network device, and performs measurement to obtain a measurement result.

Step 3: The terminal device #2 sends the measurement result to the second network device.

Step 4: The second network device may determine, based on the measurement result, interference of the cell #1 to the terminal device #2.

In this application, the interference of the cell #1 to the terminal device #2 may also be considered as the interference of the first beam to the second beam that is sent by the first network device at the preset power.

Step 5: The second network device reports, to the centralized control node, the interference of the cell #1 to the terminal device #2.

In other words, the second network device reports the interference of the first beam to the second beam to the centralized control node.

It may be understood that, similar to step 1 to step 5, the centralized control node may alternatively obtain interference of the cell #2 to the terminal device #1, that is, obtain the interference of the second beam to the first beam that is sent by the second network device at the preset power.

The first beam is denoted as a beam #1, and the second beam is denoted as a beam #2 below.

In a manner, in a linear domain scale, interference of the beam #1 to the beam #2 (or the interference of the cell #1 to the terminal device #2) may be denoted as $PL_{12*}$, interference of the beam #2 to the beam #1 (or the interference of the cell #2 to the terminal device #1) may be denoted as $PL_{21*}$, noise floor of the terminal device #1 may be denoted as $N_{1*}$, and noise floor of the terminal device #2 may be denoted as $N_2$*.

In the linear domain scale, that a ratio of interference of the first beam to the second beam to noise floor of a receiver (namely, noise floor of the terminal device #2) is greater than a first threshold, and a ratio of interference of the second beam to the first beam to the noise floor of the receiver (namely, the noise floor of the terminal device #1) is greater than the first threshold may be represented by using the following inequality:

$$PL_{12}^{*}/N_{2}^{*} > H_{1}^{*}, \text{ and } PL_{21}^{*}/N_{1}^{*} > H_{2}^{*}.$$

Herein, $H_1$* and >$H_2$* may be the same, or may be different. This is not limited.

In another manner, in a decibel domain scale (or referred to as a logarithm domain scale), interference of the beam #1 to the beam #2 may be denoted as $PL_{12}$, interference of the beam #2 to the beam #1 may be denoted as $PL_{21}$, noise floor of the terminal device #1 may be denoted as $N_1$, and noise floor of the terminal device #2 may be denoted as $N_2$.

In the decibel domain scale, that a ratio of interference of the first beam to the second beam to noise floor of a receiver (namely, noise floor of the terminal device #2) is greater than a first threshold, and a ratio of interference of the second beam to the first beam to the noise floor of the receiver (namely, noise floor of the terminal device #1) is greater than the first threshold may be represented by using the following inequality:

$$PL_{12} - N_2 > H_1, \text{ and } PL_{21} - N_1 > H_2.$$

Herein, $H_1$ and >$H_2$ may be the same, or may be different. This is not limited.

It should be understood that, when the ratio of the interference of the first beam to the second beam to the noise floor of the receiver is greater than the first threshold, it may be considered that the interference of the first beam to the second beam is far greater than the noise floor of the receiver. When the ratio of the interference of the second beam to the first beam to the noise floor of the receiver is greater than the first threshold, it may be considered that the interference of the second beam to the first beam is far greater than the noise floor of the receiver.

In addition, in another possible case, the centralized control node may determine whether the interference of the second beam to the first beam is far greater than the noise floor of the terminal device #1 and interference of another neighboring cell, and whether the interference of the first beam to the second beam is far greater than the noise floor of the terminal device #2 and interference of another neighboring cell.

For example, a neighboring cell of the cell #1 includes a cell #4, the centralized control node determines that a fourth network device sends a fourth beam on a first time-frequency resource, where the fourth beam causes interference to the first beam, and a ratio of interference of the first beam to the fourth beam to the noise floor of the receiver is less than or equal to the first threshold (for example, the first beam does not cause interference to the fourth beam).

If the interference of the fourth beam to the first beam (or interference of the cell #4 to the terminal device #1) is denoted as $PL_{41}$, in the decibel domain scale, that the interference of the second beam to the first beam is far greater than the noise floor of the terminal device #1 and the interference of the another neighboring cell may be represented by using the following inequality:

$$PL_{21} - (N_1 + PL_{41}) > H_3$$

It should be further understood that, in another possible case, the centralized control node determines that the fourth network device sends the fourth beam on a part (denoted as a time-frequency resource #N) of the first time-frequency resource, where the fourth beam causes interference to the first beam.

In this case, on the time-frequency resource #N, the interference of the second beam to the first beam may be far greater than the noise floor of the terminal device #1 and the interference of the another neighboring cell.

On a time-frequency resource other than the time-frequency resource #N in the first time-frequency resource, the interference of the second beam to the first beam may be far greater than the noise floor of the terminal device #1.

S220: When the first condition is met, the centralized control node sends first indication information to the first network device, and sends second indication information to the second network device. Correspondingly, the first network device receives the first indication information, and the second network device receives the second indication information.

The first indication information indicates to reduce transmit power of the first beam on the first time-frequency resource, and the second indication information indicates to reduce transmit power of the second beam on the first time-frequency resource.

Optionally, the first indication information and the second indication information may further include positions of the first time-frequency resource in time domain and frequency domain.

For example, the first time-frequency resource is the TTI #2 and the TTI #3 in time domain, and is the frequency #2 and the frequency #3 in frequency domain.

It should be understood that the centralized control node may determine a first reduction amplitude of the transmit power of the first beam on the first time-frequency resource and a second reduction amplitude of the transmit power of the second beam on the first time-frequency resource.

In a manner, the first reduction amplitude and the second reduction amplitude are of different values.

For example, the first network device intends to send the first beam at preset power #1, and the second network device intends to send the second beam at preset power #2. When the first condition is met, a reduction amplitude of the preset power #1 may be $PL_{21}-N_1$, and a reduction amplitude of the preset power #2 may be $PL_{12}-N_2$.

In another manner, the first reduction amplitude and the second reduction amplitude are of a same value.

If the first reduction amplitude and the second reduction amplitude are the same, a power reduction amplitude in the decibel domain scale may be determined in the following manners.

Manner 1:

A power reduction amplitude (denoted as A) may be determined by using the following formula:

$$\Delta = \min(PL_{12} - N_2, PL_{21} - N_1)$$

Manner 2:

A power reduction amplitude may be determined by using the following formula:

$$\Delta = \min(PL_{12} - N_2 - X, PL_{21} - N_1 - X),$$

where X is reserved power.

It should be understood that, by setting the reserved power, impact of a power reduction on a signal to interference plus noise ratio can be reduced. Beneficial effects of setting the reserved power are not described in the following.

Manner 3:

A power reduction amplitude may be determined by using the following formula:

$$\Delta = \max(PL_{12} - N_2, PL_{21} - N_1).$$

Manner 4:

A power reduction amplitude may be determined by using the following formula:

$$\Delta = \max(PL_{12} - N_2 - X, PL_{21} - N_1 - X).$$

It may be understood that, compared with that in the manner 3 and the manner 4, the power reduction amplitude in the manner 1 and the manner 2 is smaller. Therefore, on a premise that communication performance is ensured, compared with that in the manner 3 and the manner 4, a data transmission rate can be improved in the manner 1 or the manner 2.

S230: The first network device reduces the transmit power of the first beam on the first time-frequency resource based on the first indication information.

In a possible manner, the first indication information further includes the first reduction amplitude.

In this manner, the first network device determines reduced transmit power of the first beam on the first time-frequency resource based on the first reduction amplitude.

In another possible manner, the first indication information further includes reduced transmit power of the first beam on the first time-frequency resource.

S240: The second network device reduces the transmit power of the second beam on the first time-frequency resource based on the second indication information.

In a possible manner, the second indication information further includes the second reduction amplitude.

In this manner, the second network device determines reduced transmit power of the second beam on the first time-frequency resource based on the second reduction amplitude.

In another possible manner, the second indication information further includes reduced transmit power of the second beam on the first time-frequency resource.

According to the method of this application, when the interference is far greater than the noise floor of the receiver, the signal to interference plus noise ratio meets the following:

$$SINR = \frac{S}{I+N} \approx \frac{S}{I}.$$

Because both the first network device and the second network device reduce the transmit power, and both S and I are reduced, impact on the signal to interference plus noise ratio can be reduced, communication performance of the first network device and the second network device can be ensured, and power consumption of the network device can also be reduced.

Optionally, the method further includes the following steps.

S250: The centralized control node determines whether a second condition is met.

The second condition is that a third network device sends a third beam on the first time-frequency resource, a ratio of interference of the first beam to the third beam to the noise floor of the receiver is greater than the first threshold. A ratio of interference of the third beam to the first beam to the noise floor of the receiver may be less than or equal to the first threshold (for example, the third beam does not cause interference to the first beam).

That a ratio of interference of the first beam to the third beam to the noise floor of the receiver (namely, noise floor of a terminal device #3) is greater than the first threshold may be understood as that before the transmit power of the first beam is reduced, the interference of the first beam to the third beam is far greater than the noise floor of the terminal device #3.

It may be understood that, similar to step 1 to step 5 in S210, the centralized control node also obtains the interference of the first beam to the third beam (or interference of the cell #1 to the terminal device #3) that is sent by the first network device at the preset power, and the interference of the third beam to the first beam (or interference of the cell #3 to the terminal device #1) that is sent by the third network device at the preset power.

In other words, on the first time-frequency resource, the first network device needs to send the first beam, the second network device needs to send the second beam, and the third network device needs to send the third beam. The first beam and the second beam interfere with each other, and the first beam causes interference to the third beam.

It should be understood that S250 is performed when S230 needs to be performed.

S260: When the second condition is met, the centralized control node sends third indication information to the third network device, where the third indication information indicates to reduce transmit power of the third beam on the first time-frequency resource.

Optionally, the third indication information further includes a position of the first time-frequency resource and a reduction amplitude (denoted as a third reduction amplitude) of the transmit power of the third beam on the first time-frequency resource.

The third reduction amplitude may be the same as the first reduction amplitude and the second reduction amplitude, or may be different from the first reduction amplitude and the second reduction amplitude.

For example, the third reduction amplitude may be calculated by using the following formula:

$$\Delta = PL_{13} - N_3,$$

where $PL_{13}$ is the interference of the first beam to the third beam (or the interference of the cell #1 to the terminal device #3).

It should be understood that, if the second condition is met, it means that if the third network device sends the third beam to the terminal device #3 at the preset power, a large part of the preset power is used to overcome the interference of the first beam to the third beam.

Because the transmit power of the first beam on the first time-frequency resource is reduced, that is, the interference of the first beam to the third beam on the first time-frequency resource is reduced, in a possible manner, the third network device may reduce power for sending the third beam, to reduce power consumption. In another possible manner, the third network device may still send the third beam at the preset power. Because the interference of the first beam to the third beam on the first time-frequency resource is reduced, the third network device sends the third beam at the preset power, and this can improve a transmission rate of downlink data transmission.

Optionally, there is an overlapping time-frequency resource (denoted as a time-frequency resource #M) between the time-frequency resource for sending the third beam and the time-frequency resource for sending the first beam, and the time-frequency resource #M may be a part of the first time-frequency resource. In this case, the third indication information indicates to reduce transmit power of the third beam on the time-frequency resource #M.

In addition, optionally, in a case, before S210, the method further includes S201 to S203.

S201: The first network device sends first information to the centralized control node. Correspondingly, the centralized control node receives the first information.

The first information includes information about the first beam and the time-frequency resource (denoted as a time-frequency resource #A) used by the first network device to send the first beam. In other words, the first information directly indicates that a beam invoked for transmitting first downlink data is the first beam, and indicates a time-frequency resource for sending the first beam.

In another manner, the first information includes the time-frequency resource #A and a probability that each beam in a first beam group is invoked. In other words, the first information does not directly indicate a beam invoked for transmitting the first downlink data.

For example, a plurality of beams included in the first beam group are a beam #A, a beam #B, and a beam #C. A probability that the first network device invokes the beam #A to transmit the first downlink data is a probability #A, a probability that the first network device invokes the beam #B is a probability #B, and a probability that the first network device invokes the beam #C is a probability #C.

S202: The second network device sends second information to the centralized control node. Correspondingly, the centralized control node receives the second information.

The second information includes information about the second beam and the time-frequency resource (denoted as a time-frequency resource #B) used by the second network device to send the second beam. In other words, the second information directly indicates that a beam invoked for transmitting second downlink data is the second beam, and indicates a time-frequency resource for sending the second beam.

In another manner, the second information includes the time-frequency resource #B and a probability that each beam in a second beam group is invoked. In other words, the second information does not directly indicate a beam invoked for transmitting the second downlink data.

For example, a plurality of beams included in the second beam group are a beam #D, a beam #E, and a beam #F. A probability that the first network device invokes the beam #D to transmit the second downlink data is a probability #D, a probability that the first network device invokes the beam #E is a probability #E, and a probability that the first network device invokes the beam #F is a probability #F.

S203: The third network device sends third information to the centralized control node. Correspondingly, the centralized control node receives the third information.

The third information includes information about the third beam and a time-frequency resource used by the third network device to send the third beam.

This process is similar to S201 and S202. Details are not described again.

On a basis that the method further includes S201 and S202, in S210, the centralized control node may determine, based on the first information and the second information, whether the first condition is met.

The centralized control node may determine whether the time-frequency resource #A and the time-frequency resource #B overlap.

The centralized control node may determine whether the first beam and the second beam interfere with each other. In other words, the centralized control node may determine whether the first beam and the second beam are an interference beam pair.

When the first beam and the second beam are the interference beam pair, the centralized control node may determine whether the ratio of the interference of the first beam to the second beam to the noise floor of the receiver is greater than the first threshold, and whether the ratio of the interference of the second beam to the first beam to the noise floor of the receiver is greater than the first threshold.

Alternatively, for example, the first beam group includes the beam #A, the beam #B, and the beam #C, and the second beam group includes the beam #D, the beam #E, and the beam #F. The probability of invoking the beam #A is greater than a second threshold, the probability of invoking the beam #B is less than the second threshold, the probability of invoking the beam #C is less than the second threshold, the probability of invoking the beam #D is greater than a third threshold, the probability of invoking the beam #E is less than the third threshold, and the probability of invoking the beam #F is less than the third threshold. The second threshold may be equal to the third threshold, or the second threshold is different from the third threshold.

If the beam #A and the beam #D interfere with each other, the centralized control node determines that the beam invoked for transmitting the first downlink data and the beam invoked for transmitting the second downlink data interfere with each other. Further, the centralized control node determines whether a ratio of interference of the beam #A to the beam #D to the noise floor of the receiver is greater than the first threshold, and whether a ratio of interference of the beam #D to the beam #A to the noise floor of the receiver is greater than the first threshold.

If the beam #A and the beam #D do not interfere with each other, the centralized control node determines that the beam invoked for transmitting the first downlink data and the beam invoked for transmitting the second downlink data do not interfere with each other.

Optionally, in another case, before S210, the method further includes S204 to S206.

S204: The centralized control node sends first configuration information to the first network device.

The first configuration information indicates the time-frequency resource used by the first network device to send the first beam.

S205: The centralized control node sends second configuration information to the second network device.

The second configuration information indicates the time-frequency resource used by the second network device to send the second beam.

S206: The centralized control node sends third configuration information to the third network device.

The third configuration information indicates the time-frequency resource used by the third network device to send the third beam.

On a basis that the method further includes S204 and S205, in S210, the centralized control node may determine, based on the first configuration information and the second configuration information, whether the first condition is met.

For example, the time-frequency resource for sending the first beam is the TTI #1 to the TTI #3 in time domain, and is the frequency #1 to the frequency #3 in frequency domain. The time-frequency resource for sending the second beam is the TTI #2 to the TTI #4 in time domain, and is the frequency #2 to the frequency #4 in frequency domain. In this case, the overlapping first time-frequency resource is the TTI #2 and the TTI #3 in time domain, and is the frequency #2 and the frequency #3 in frequency domain.

The centralized control node may further determine whether the first beam and the second beam interfere with each other. When the first beam and the second beam are the interference beam pair, the centralized control node may determine whether the ratio of the interference of the first beam to the second beam to the noise floor of the receiver is greater than the first threshold, and whether the ratio of the interference of the second beam to the first beam to the noise floor of the receiver is greater than the first threshold.

It should be understood that the foregoing method 200 is described by using an example in which two cells are mutually interference coordinating cells. It is clear that the method in this application is also applicable to a scenario in which a plurality of cells interfere with each other. It may be understood that the centralized control node may determine an interference coordinating cell group corresponding to each cell.

In an example, an interference coordinating cell group of the cell #1 is (the cell #1, the cell #2, and the cell #3). If the centralized control node determines that the cell #1, the cell #2, and the cell #3 send a beam on a same time-frequency resource (beams in the three cells are respectively denoted as the beam #1, the beam #2, and the beam #3), mutual interference between the beam #1 and the beam #2 is far greater than the noise floor of the receiver, mutual interference between the beam #1 and the beam #3 is far greater than the noise floor of the receiver, and mutual interference between the beam #2 and the beam #3 is far greater than the noise floor of the receiver, transmit power of the beam #1, transmit power of the beam #2, and transmit power of the beam #3 may be reduced at the same time.

Figure 4:
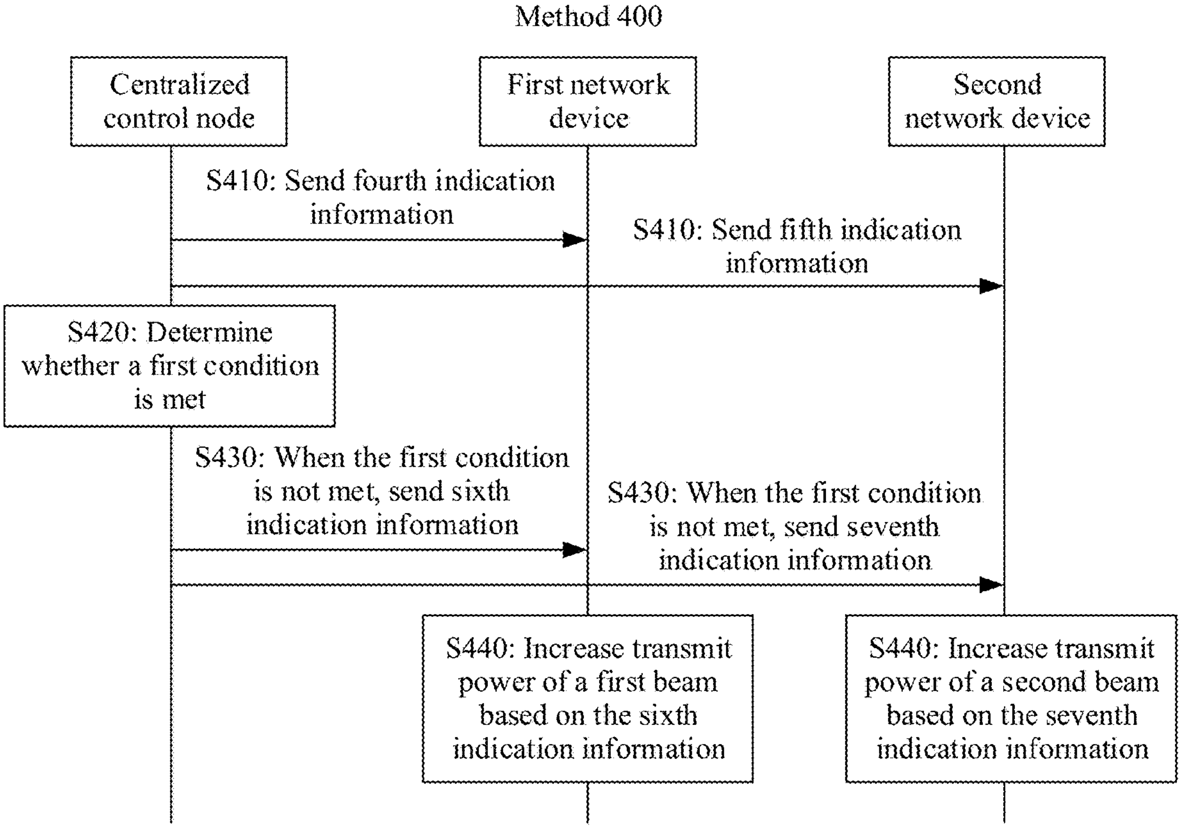
FIG. 4 is an interaction diagram of a method according to this application.

FIG. 4 shows a method 400 according to this application. The method 400 is applicable to the communication system shown in (a) in FIG. 1. Specifically, the method 400 includes the following steps.

S410: A centralized control node sends fourth indication information to a first network device, and sends fifth indication information to a second network device. Correspondingly, the first network device receives the fourth indication information, and the second network device receives the fifth indication information.

The fourth indication information indicates to reduce beam transmit power of the first network device, and the fifth indication information indicates to reduce beam transmit power of the second network device.

Optionally, the fourth indication information and the fifth indication information may further include a reduction amplitude of the beam transmit power. The reduction amplitude of the beam transmit power may be calculated with reference to the manner in S220.

S420: The centralized control node determines whether a first condition is met.

The first condition is that there is an overlapping first time-frequency resource between a time-frequency resource used by the first network device to send a first beam and a time-frequency resource used by the second network device to send a second beam, a ratio of interference of the first beam to the second beam to noise floor of a receiver is greater than a first threshold, and a ratio of interference of the second beam to the first beam to the noise floor of the receiver is greater than the first threshold.

In other words, in S420, the centralized control node determines whether the interference of the first beam to the second beam that is sent by the first network device at preset power (namely, transmit power before a power reduction) is far greater than the noise floor of the receiver, and determines whether the interference of the second beam to the first beam that is sent by the second network device at the preset power is far greater than the noise floor of the receiver.

It may be understood that the preset power at which the first network device sends the first beam may be the same as or different from the preset power at which the second network device sends the second beam.

In addition, in another possible case, the centralized control node may determine whether the interference of the second beam to the first beam is far greater than noise floor of a terminal device #1 and interference of another neighboring cell, and whether the interference of the first beam to the second beam is far greater than noise floor of a terminal device #2 and interference of another neighboring cell.

For details of S420, refer to the description of S210.

S430: When the first condition is not met, the centralized control node sends sixth indication information to the first network device, and sends seventh indication information to the second network device. Correspondingly, the first network device receives the sixth indication information, and the second network device receives the seventh indication information.

The sixth indication information indicates to increase transmit power of the first beam. The seventh indication information indicates to increase transmit power of the second beam.

For example, the preset power at which the first network device sends the first beam is 100 W, and the preset power at which the second network device sends the second beam is 150 W. In S410, the centralized control node may indicate the first network device and the second network device to reduce power when sending a beam. In S420, the centralized control node determines that when the first network device sends the first beam at 100 W and the second network device sends the second beam at 150 W, mutual interference between the first beam and the second beam is not far greater than the noise floor of the receiver. In S430, the centralized control node may indicate the first network device to still send the first beam at the preset power, and indicate the second network device to still send the second beam at the preset power.

S440: The first network device increases the transmit power of the first beam based on the sixth indication information, and the second network device increases the transmit power of the second beam based on the seventh indication information.

For example, the preset power for sending the first beam by the first network device is power #1. In S410, the first network device adjusts the transmit power of the first beam from the power #1 to power #2 based on the fourth indication information. In S440, the first network device adjusts the transmit power of the first beam from the power #2 to the power #1 based on the sixth indication information. In other words, the first network device may still send the first beam at the preset power. The second network device is similar to this.

Optionally, when the first condition is met, the centralized control node may send a message #A to the first network device and the second network device, where the message #A indicates a position of a first time-frequency resource. When sending the first beam, the first network device reduces transmit power on the first time-frequency resource. For a time-frequency resource other than the first time-frequency resource, the first network device may send the first beam at original preset power. The second network device is similar to this.

According to the solution of this application, the centralized control node may first notify a network device to reduce beam transmit power, and when the first condition is not met, notify the network device to increase the beam transmit power. In other words, when the first condition is met, both the two network devices reduce the beam transmit power, to achieve an energy saving objective. In addition, because both the two network devices reduce the beam transmit power, impact on a signal to interference plus noise ratio can be reduced, and communication performance of the first network device and the second network device can be ensured. In addition, compared with that in the method 200, when the first condition is not met, the centralized control node notifies the two network devices to increase transmit power, so that a transmission rate of downlink data transmission performed by the two network devices can be improved.

Optionally, the method further includes S450 to S480.

S450: The centralized control node sends eighth indication information to a third network device, where the eighth indication information indicates to reduce beam transmit power of the third network device. Correspondingly, the third network device receives the eighth indication information.

Optionally, a reduction amplitude of the beam transmit power of the third network device may be equal to/not equal to reduction amplitudes of the beam transmit power of the first network device and the beam transmit power of the second network device.

For example, the reduction amplitude of the beam transmit power of the third network device may be calculated with reference to the manner in S260.

S460: The centralized control node determines whether a second condition is met.

The second condition is that the third network device sends a third beam on the first time-frequency resource, a ratio of interference of the first beam to the third beam to the noise floor of the receiver is greater than the first threshold, and a ratio of interference of the third beam to the first beam to the noise floor of the receiver is less than or equal to the first threshold (for example, the third beam does not cause interference to the first beam).

Alternatively, there is an overlapping time-frequency resource (denoted as a time-frequency resource #M) between the time-frequency resource for sending the third beam and the time-frequency resource for sending the first beam, and the time-frequency resource #M may be a part of the first time-frequency resource. The second condition is that the third network device sends the third beam on the time-frequency resource #M, a ratio of interference of the first beam to the third beam to the noise floor of the receiver is greater than the first threshold, and a ratio of interference of the third beam to the first beam to the noise floor of the receiver is less than or equal to the first threshold (for example, the third beam does not cause interference to the first beam).

S470: When the second condition is not met, the centralized control node sends ninth indication information to the third network device, where the ninth indication information indicates to increase transmit power of the third beam.

S480: The third network device increases the transmit power of the third beam based on the ninth indication information.

For example, preset power for sending the third beam by the third network device is power #3. In S450, the third network device may adjust the transmit power of the third beam from the power #3 to power #4 based on the eighth indication information. In S480, because the second condition is not met, the third network device may adjust the transmit power of the third beam from the power #4 to the power #3 based on the ninth indication information. In other words, the third network device may still send the third beam at the preset power.

Optionally, when the second condition is met, the centralized control node may send a message #B to the third network device. The message #B indicates the position of the first time-frequency resource, and the third network device reduces transmit power on the first time-frequency resource when sending the third beam. For a time-frequency resource other than the first time-frequency resource, the third network device may send the third beam at the preset power.

Alternatively, the message #B indicates a position of the time-frequency resource #M. When sending the third beam, the third network device reduces the transmit power on the time-frequency resource #M. For a time-frequency resource other than the time-frequency resource #M, the third network device may send the third beam at the preset power.

Optionally, in a case, before S420, the method further includes S201 and S202. Details are not described herein again.

Optionally, in another case, before S420, the method further includes S204 and S205. Details are not described herein again.

It should be understood that the foregoing method 400 is described by using an example in which two cells are mutually interference coordinating cells. It is clear that the method in this application is also applicable to a scenario of a plurality of cells.

In an example, an interference coordinating cell group of a cell #1 is (the cell #1, a cell #2, and a cell #3), and the centralized control node first indicates a network device that manages the cell #1, the cell #2, and the cell #3 to reduce transmit power of beams. Then, the centralized control node determines that although the cell #1, the cell #2, and the cell #3 send beams on a same time-frequency resource (beams in the three cells are respectively denoted as a beam #1, a beam #2, and a beam #3), the beam #1, the beam #2, and the beam #3 do not interfere with each other.

In this case, the centralized control node may indicate the network device that manages the cell #1, the cell #2, and the cell #3 to increase transmit power of the beams.

In addition, in a centralized control manner, the following cases may further occur.

Figure 5:
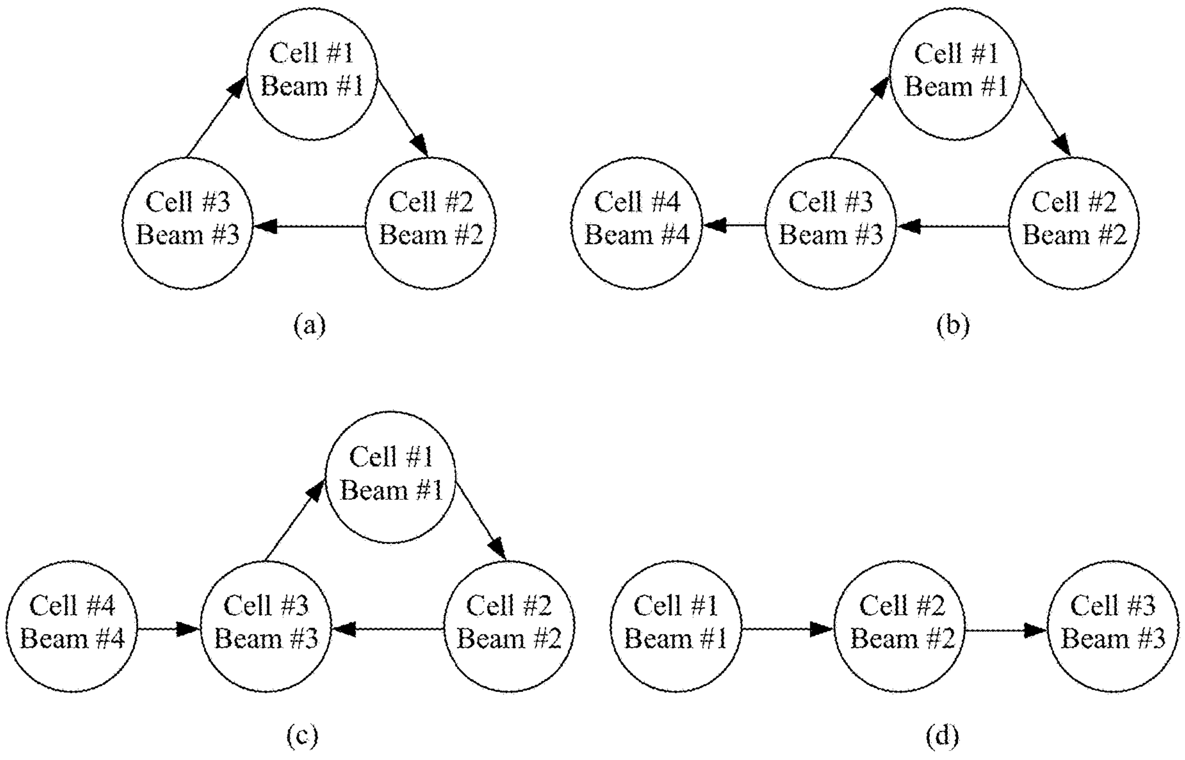
FIG. 5 shows a situation of interference between a plurality of cells.

Case 1:

As shown in a in FIG. 5, three cells are used as an example. A centralized control node determines that a cell #1, a cell #2, and a cell #3 need to send a beam (beams in the three cells are respectively denoted as a beam #1, a beam #2, and a beam #3) on a same time-frequency resource. The beam #1 causes interference to the beam #2, the beam #2 causes interference to the beam #3, and the beam #3 causes interference to the beam #1. $PL_{12}$ is far greater than noise floor of a receiver, $PL_{23}$ is far greater than the noise floor of the receiver, and $PL_{31}$ is far greater than the noise floor of the receiver. In this case, the centralized control node notifies network devices in the three cells to reduce transmit power of the beam #1, transmit power of the beam #2, and transmit power of the beam #3.

It should be understood that $PL_{ij}$ in this application means interference of a beam i to a beam j.

Optionally, power reduction amplitudes of the beam #1 to the beam #3 are the same.

For example, power reduction amplitude=min($PL_2$−N, $PL_{23}$−N, $PL_{31}$−N).

For another example, power reduction amplitude=min ($PL_2$−N−X, $PL_{23}$−N−X, $PL_{31}$−N−X).

Case 2:

As shown in b in FIG. 5, four cells are used as an example. A centralized control node determines that a cell #1 to a cell #4 need to send a beam (beams in the four cells are respectively denoted as a beam #1 to a beam #4) on a same time-frequency resource. The beam #1 causes interference to the beam #2, the beam #2 causes interference to the beam #3, and the beam #3 causes interference to the beam #1 and the beam #4. $PL_{12}$ is far greater than noise floor of a receiver, $PL_{23}$ is far greater than the noise floor of the receiver, $PL_{31}$ is far greater than the noise floor of the receiver, and $PL_{34}$ is far greater than the noise floor of the receiver.

In a case, the centralized control node notifies network devices in the four cells to reduce transmit power of the beam #1 to transmit power of the beam #4.

Optionally, power reduction amplitudes of the beam #1 to the beam #4 are the same.

For example, power reduction amplitude=min($PL_{12}$−N, $PL_{23}$−N, $PL_{31}$−N, $PL_{34}$−N).

For example, power reduction amplitude=min($PL_{12}$−N−X, $PL_{23}$−N−X, $PL_{31}$−N−X, $PL_{34}$−N−X).

In another case, the centralized control node notifies network devices in the cell #1 to the cell #3 to reduce transmit power of the beam #1 to transmit power of the beam #3. In other words, transmit power of the beam #4 may not be reduced.

Case 3:

As shown in c in FIG. 5, four cells are used as an example. A centralized control node determines that a cell #1 to a cell #4 need to send a beam (beams in the four cells are respectively denoted as a beam #1 to a beam #4) on a same time-frequency resource. The beam #1 causes interference to the beam #2, the beam #2 causes interference to the beam #3, the beam #3 causes interference to the beam #1, and the beam #4 causes interference to the beam #3. $PL_{12}$ is far greater than noise floor of a receiver, $PL_{23}$ is far greater than the noise floor of the receiver, $PL_{31}$ is far greater than the noise floor of the receiver, and $PL_{43}$ is far greater than the noise floor of the receiver. The centralized control node notifies network devices in the four cells to reduce transmit power of the beam #1 to transmit power of the beam #4.

Optionally, power reduction amplitudes of the beam #1 to the beam #4 are the same.

For example, power reduction amplitude=min($PL_{12}$−N, $PL_{23}$−N, $PL_{31}$−N, $PL_{43}$−N).

For example, power reduction amplitude=min($PL_{12}$−N−X, $PL_{23}$−N−X, $PL_{31}$−N−X, $PL_{43}$−N−X).

Case 4:

As shown in d in FIG. 5, three cells are used as an example. A centralized control node determines that a cell #1 to a cell #3 need to send a beam (beams in the three cells are respectively denoted as a beam #1 to a beam #3) on a same time-frequency resource. The beam #1 causes interference to the beam #2, the beam #2 causes interference to the beam #3, and the beam #3 does not cause interference to the beam #1. $PL_{12}$ is far greater than noise floor of a receiver, and $PL_{23}$ is far greater than the noise floor of the receiver.

In a possible case, the centralized control node notifies network devices in the three cells to reduce transmit power of the beam #1 to transmit power of the beam #3.

Optionally, power reduction amplitudes of the beam #1 to the beam #3 are the same.

For example, power reduction amplitude=min($PL_{12}$−N, $PL_{23}$−N).

For another example, power reduction amplitude=min ($PL_{12}$−N−X, $PL_{23}$−N−X).

In another possible case, the centralized control node notifies network devices in the cell #1 and the cell #2 to reduce transmit power of the beam #1 and transmit power of the beam #2. In other words, transmit power of the beam #3 may remain unchanged. It should be understood that, because the transmit power of the beam #2 is reduced, $PL_{23}$ is reduced. If the transmit power of the beam #3 remains unchanged, a downlink data transmission rate of a network device in the cell #3 is improved.

Figure 6:
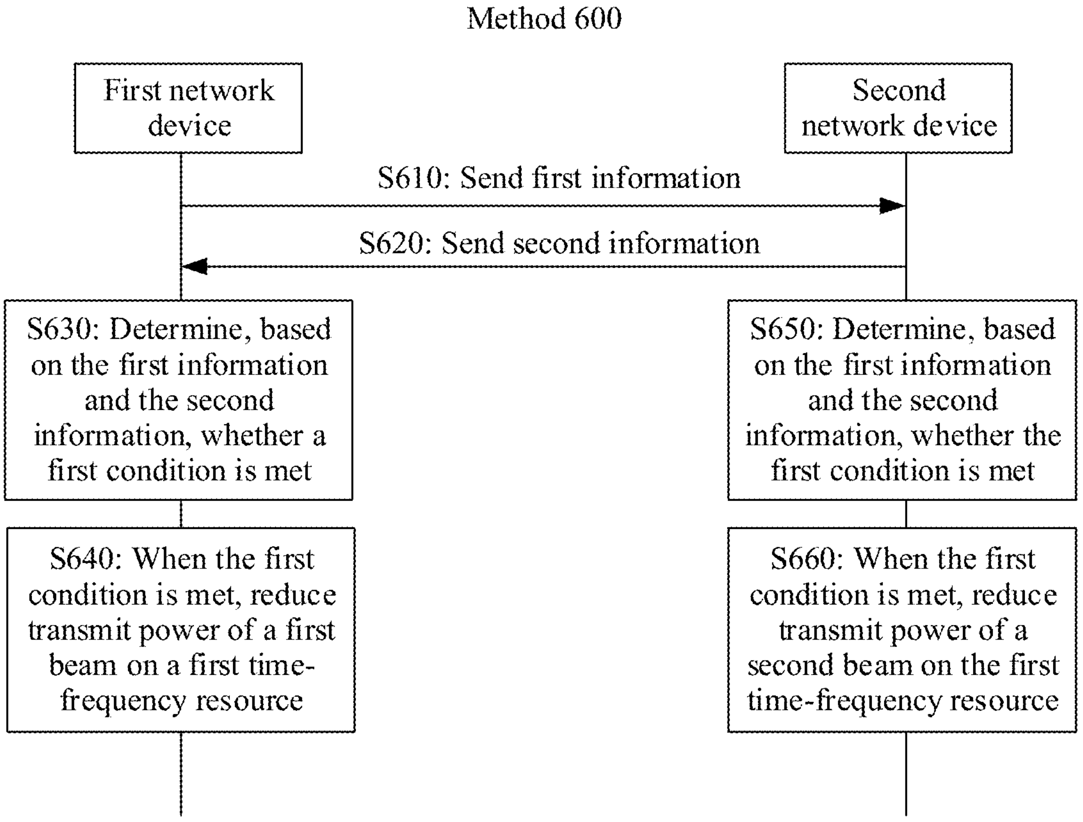
FIG. 6 is an interaction diagram of a method according to this application.

FIG. 6 shows a method 600 according to this application. The method is applicable to the communication system shown in (b) in FIG. 1. A cell #1 and a cell #2 are mutually interference coordinating cells. Specifically, the method 600 includes the following steps.

S610: A first network device sends first information to a second network device. Correspondingly, the second network device receives the first information.

The first information includes a time-frequency resource (denoted as a time-frequency resource #A) used by the first network device to send a first beam, and interference of a second beam to the first beam (or interference of the cell #2 to a terminal device #1). It should be understood that the first network device also stores the first information.

It should be understood that, for a manner in which a first network device obtains the interference of the second beam to the first beam, refer to S210. The first network device sends the first beam to perform first downlink data transmission with the terminal device #1.

The following describes a manner in which the first information indicates the time-frequency resource #A.

Manner A:

The time-frequency resource #A includes a first time domain and a first frequency domain. In other words, the first information indicates an accurate position of a time-frequency resource used for transmitting first downlink data.

Manner B:

The time-frequency resource #A includes a first time domain and a first proportion occupying a specific frequency domain.

In a possible manner, both frequency domain resources that can be used by the first network device and the second network device are the specific frequency domain.

For example, the specific frequency domain is a frequency #A to a frequency #B, and the first information indicates that a frequency domain resource in the time-frequency resource #A occupies 80% of the frequency #A to the frequency #B.

Optionally, the first network device may estimate whether the first network device performs first downlink data transmission on a time domain resource #A. For example, the first network device may perform the estimation based on information such as a data amount buffered on a base station side and a scheduling queue. The first information may indicate whether the first network device performs first downlink data transmission on the time-frequency resource #A.

In a special case, only when the first proportion is greater than a fourth threshold, the first network device sends the first information. In other words, in this case, the first information indicates the first network device to perform first downlink data transmission in the first time domain, and implicitly indicates that the first proportion is greater than the fourth threshold.

Optionally, in another case, the first information includes a probability that each beam in a first beam group is invoked. In other words, the first information does not directly indicate a beam invoked for transmitting the first downlink data. For details, refer to the foregoing description.

S620: The second network device sends second information to the first network device. Correspondingly, the first network device receives the second information.

The second information includes a time-frequency resource (denoted as a time-frequency resource #B) used by the second network device to send a second beam, and interference of the first beam to the second beam (or interference of the cell #1 to a terminal device #2). It should be understood that the second network device also stores the second information.

It should be understood that, for a manner in which a second network device obtains the interference of the first beam to the second beam, refer to S210. The second network device sends the second beam to perform second downlink data transmission.

The following describes a manner in which the second information indicates the time-frequency resource #B.

Manner A:

The time-frequency resource #B includes a second time domain and a second frequency domain. In other words, the second information indicates an accurate position of a time-frequency resource #B used for transmitting second downlink data.

Manner B:

The time-frequency resource #B includes a second time domain and a second proportion occupying a specific frequency domain.

In a possible manner, both frequency domain resources that can be used by the first network device and the second network device are the specific frequency domain.

For example, the specific frequency domain is a frequency #A to a frequency #B, and the second information indicates that a frequency domain resource in the time-frequency resource #B occupies 85% of the frequency #A to the frequency #B.

Optionally, the second network device may estimate whether the second network device performs first downlink data transmission on a time domain resource #B. For example, the second network device may perform the estimation based on information such as a data amount buffered on a base station side and a scheduling queue. The second information may indicate whether the second network device performs second downlink data transmission on the time-frequency resource #B.

In a special case, only when the second proportion is greater than a fourth threshold, the first network device sends the second information. In other words, in this case, the second information indicates the second network device to perform second downlink data transmission in the second time domain, and implicitly indicates that the second proportion is greater than the fourth threshold.

Optionally, in another case, the second information includes a probability that each beam in a second beam group is invoked. In other words, the second information does not directly indicate a beam invoked for transmitting the second downlink data. For details, refer to the foregoing description.

It should be understood that S620 may be performed before S610, or may be performed at the same time with S610.

S630: The first network device determines, based on the first information and the second information, whether a first condition is met.

The first condition is that there is an overlapping first time-frequency resource between the time-frequency resource #A and the time-frequency resource #B, a ratio of the interference of the first beam to the second beam to noise floor of a receiver is greater than a first threshold, and a ratio of the interference of the second beam to the first beam to the noise floor of the receiver is greater than the first threshold.

The following describes how the first network device determines whether the time-frequency resource #A overlaps with the time-frequency resource #B.

Case A:

If S610 is performed in a manner #A and S620 is performed in the manner #A, the first network device determines, based on the first time domain, the first frequency domain, the second time domain, and the second frequency domain, whether the time-frequency resource #A overlaps with the time-frequency resource #B.

Further, the first network device may determine positions of the first time-frequency resource in time domain and frequency domain.

Case B:

If S610 is performed in a manner #B and S620 is performed in the manner #B, when the first time domain and the second time domain overlap with each other, and both the first proportion and the second proportion are greater than the fourth threshold, the first network device determines that the time-frequency resource #A overlaps with the time-frequency resource #B.

Further, the first network device may determine a position of the first time-frequency resource in time domain. The first network device cannot accurately determine a position of the first time-frequency resource in frequency domain. In a possible implementation, the specific frequency domain is used as the position of the first time-frequency resource in frequency domain. In this case, a range of the specific frequency domain may be greater than an actual frequency domain range of the first time-frequency resource in frequency domain.

The first network device further determines whether the first beam and the second beam interfere with each other, and whether mutual interference between the first beam and the second beam is far greater than the noise floor of the receiver.

Optionally, the first network device may further determine, based on the probability that each beam in the first beam group is invoked and the probability that each beam in the second beam group is invoked, whether the beam invoked for transmitting the first downlink data and the beam invoked for transmitting the second downlink data interfere with each other, and whether the mutual interference is far greater than the noise floor of the receiver.

In a special case, the first information indicates the first network device to perform first downlink data transmission in the first time domain, and implicitly indicates that the first proportion is greater than the fourth threshold. The second information indicates the second network device to perform second downlink data transmission in the second time domain, and implicitly indicates that the second proportion is greater than the fourth threshold. In this case, if the first time domain overlaps with the second time domain, the first network device determines that there is an overlapping first time-frequency resource between the time-frequency resource #A and the time-frequency resource #B.

Optionally, the method further includes: A fourth network device sends third information to the first network device. Correspondingly, the first network device receives the third information. The third information includes a time-frequency resource used by the fourth network device to send a fourth beam.

In addition, the first network device may also obtain interference of the fourth beam to the first beam (or interference of a cell #4 to the terminal device #1).

In a possible case, the first network device may determine whether the interference of the second beam to the first beam is far greater than noise floor of the terminal device #1 and interference of another neighboring cell.

S640: When the first condition is met, the first network device reduces transmit power of the first beam on the first time-frequency resource.

In a manner, the first network device may determine a reduction amplitude of the transmit power of the first beam based on the manner 1 or the manner 2 in S220.

S650: The second network device determines, based on the first information and the second information, whether the first condition is met.

This process is similar to S630.

S660: When the first condition is met, the second network device reduces transmit power of the second beam on the first time-frequency resource.

In a manner, the second network device may determine a reduction amplitude of the transmit power of the second beam based on the manner 1 or the manner 2 in S220.

The first network device and the second network device determine the reduction amplitude of the transmit power according to a same rule. Reduction amplitudes of the transmit power of the first beam and the transmit power of the second beam may be the same, or may be different. This is not limited.

According to the method in this application, the first network device and the second network device determine, based on a same method, whether the first condition is met. When the first condition is met, both the two network devices reduce beam transmit power, to achieve an energy saving objective, and communication performance basically does not deteriorate.

It should be understood that the foregoing method 600 is described by using an example in which two cells interfere with each other. It is clear that the method in this application is also applicable to a scenario in which a plurality of cells interfere with each other.

In an example, an interference coordinating cell group of the cell #1 is (the cell #1, the cell #2, and a cell #3). If a network device in the cell #1 determines that the cell #1, the cell #2, and the cell #3 send a beam on a same time-frequency resource (beams in the three cells are respectively denoted as a beam #1, a beam #2, and a beam #3), mutual interference between the beam #1 and the beam #2 is far greater than the noise floor of the receiver, mutual interference between the beam #1 and the beam #3 is far greater than the noise floor of the receiver, and the network device in the cell #1 may reduce transmit power of the beam #1.

Figure 7:
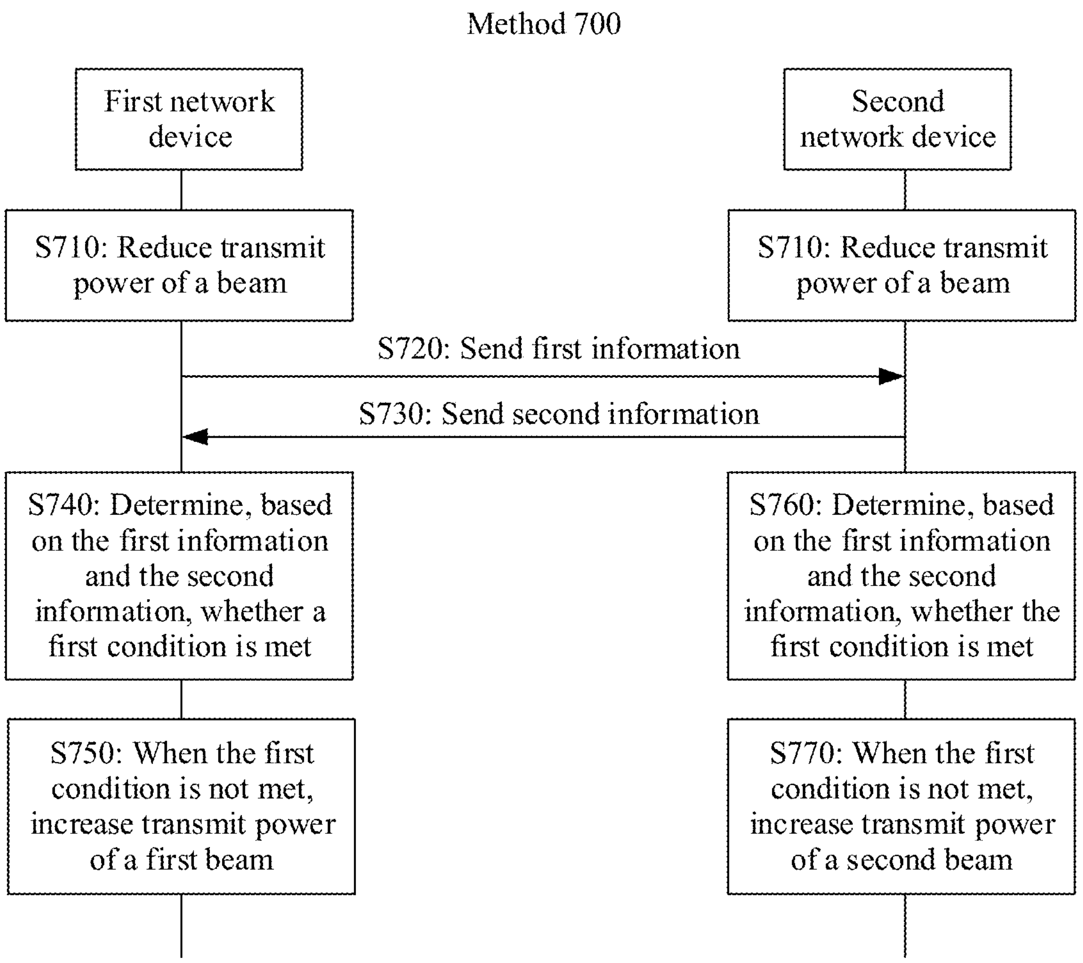
FIG. 7 is an interaction diagram of a method according to this application.

FIG. 7 shows a method 700 according to this application. The method is applicable to the communication system shown in (b) in FIG. 1. A cell #1 and a cell #2 are mutually interference coordinating cells. Specifically, the method 700 includes the following steps.

S710: A first network device reduces transmit power of a beam. A second network device reduces transmit power of a beam.

A reduction amplitude of beam transmit power may be calculated with reference to the manner in S220.

S720: The first network device sends first information to the second network device. Correspondingly, the second network device receives the first information.

The first information includes a time-frequency resource (denoted as a time-frequency resource #A) used by the first network device to send a first beam, and interference of a second beam to the first beam (or interference of the cell #2 to a terminal device #1).

For details of the process, refer to the description of S610.

Optionally, in another case, the first information includes a probability that each beam in a first beam group is invoked. In other words, the first information does not directly indicate a beam invoked for transmitting the first downlink data. For details, refer to the foregoing description.

S730: The second network device sends second information to the first network device. Correspondingly, the first network device receives the second information.

The second information includes a time-frequency resource (denoted as a time-frequency resource #B) used by the second network device to send the second beam, and interference of the first beam to the second beam (or interference of the cell #1 to a terminal device #2).

For details of the process, refer to the description of S620.

Optionally, in another case, the second information includes a probability that each beam in a second beam group is invoked. In other words, the second information does not directly indicate a beam invoked for transmitting the second downlink data. For details, refer to the foregoing description.

S740: The first network device determines, based on the first information and the second information, whether a first condition is met.

The first condition is that there is an overlapping first time-frequency resource between the time-frequency resource #A and the time-frequency resource #B, a ratio of the interference of the first beam to the second beam to noise floor of a receiver is greater than a first threshold, and a ratio of the interference of the second beam to the first beam to the noise floor of the receiver is greater than the first threshold.

For details of the process, refer to the description of S630.

Optionally, the method further includes: A fourth network device sends third information to the first network device. The third information includes a time-frequency resource used by the fourth network device to send a fourth beam.

In addition, the first network device may also obtain interference of the fourth beam to the first beam (or interference of a cell #4 to the terminal device #1).

In a possible case, the first network device may determine whether the interference of the second beam to the first beam is far greater than noise floor of the terminal device #1 and interference of another neighboring cell.

S750: When the first condition is not met, the first network device increases transmit power of the first beam.

For example, preset power at which the first network device sends the first beam is 100 W, and preset power at which the second network device sends the second beam is 150 W. In S710, the first network device expects to send the first beam at power lower than 100 W. In S740, the first network device determines that when the first network device sends the first beam at 100 W and the second network device sends the second beam at 150 W, mutual interference between the first beam and the second beam is not far greater than the noise floor of the receiver. In S750, the first network device still sends the first beam at the preset power.

Optionally, when the first condition is met, the first network device determines a position of the first time-frequency resource. When sending the first beam, the first network device reduces transmit power on the first time-frequency resource. For a time-frequency resource other than the first time-frequency resource, the transmit power of the first beam may be the preset power.

S760: The second network device determines, based on the first information and the second information, whether the first condition is met.

S770: When the first condition is not met, the second network device increases transmit power of the second beam.

For example, the preset power at which the first network device sends the first beam is 100 W, and the preset power at which the second network device sends the second beam is 150 W. In S710, the second network device expects to send the second beam at power lower than 150 W. In S760, the second network device determines that when the first network device sends the first beam at 100 W and the second network device sends the second beam at 150 W, mutual interference between the first beam and the second beam is not far greater than the noise floor of the receiver. In S770, the second network device still sends the second beam at the preset power.

Optionally, when the first condition is met, the second network device determines the position of the first time-frequency resource. When sending the second beam, the second network device reduces the transmit power on the first time-frequency resource. For a time-frequency resource other than the first time-frequency resource, the transmit power of the second beam may be the preset power.

According to the method in this application, the first network device and the second network device may first reduce the beam transmit power, then determine whether the first condition is met based on a same method, and if the first condition is not met, increase the beam transmit power. In other words, when the first condition is met, both the first network device and the second network device reduce the transmit power. In one aspect, power consumption of the network device can be reduced, and in another aspect, impact on a signal to interference plus noise ratio can be reduced, thereby ensuring communication performance of the first network device and the second network device.

It should be understood that the foregoing method 700 is described by using an example in which two cells interfere with each other. It is clear that the method in this application is also applicable to a scenario in which a plurality of cells interfere with each other.

In an example, an interference coordinating cell group of the cell #1 is (the cell #1, the cell #2, and a cell #3). A network device in the cell #1 may first reduce transmit power of a beam. If the network device in the cell #1 determines that the cell #1, the cell #2, and the cell #3 send a beam on a same time-frequency resource (beams in the three cells are respectively denoted as a beam #1, a beam #2, and a beam #3), but mutual interference between the three beams is not far greater than the noise floor of the receiver, the network device in the cell #1 may send the beam #1 at the preset power.

In addition, in a distributed control manner, the following cases may further occur.

Figure 8:
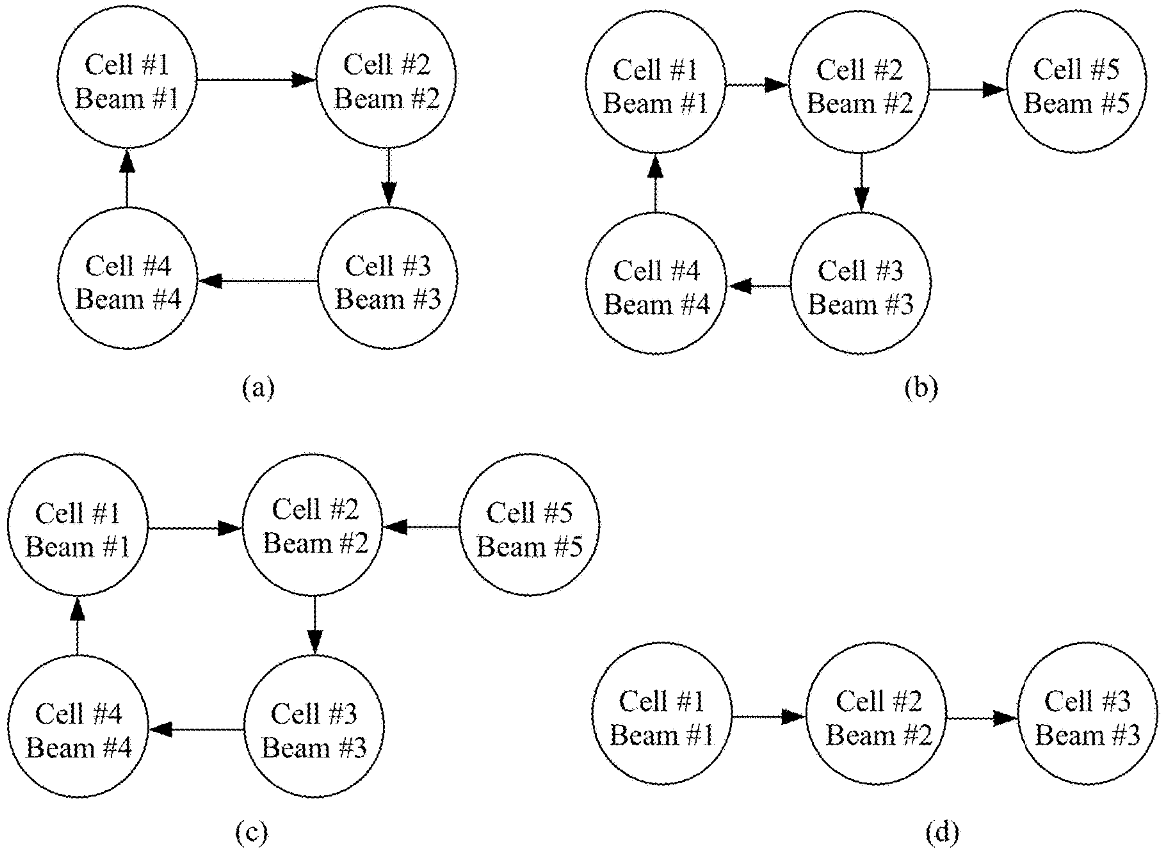
FIG. 8 shows a situation of interference between a plurality of cells.

Case 1:

As shown in a in FIG. 8, four cells are used as an example. A cell #1 to a cell #4 send beams on a same time-frequency resource (beams in the four cells are respectively denoted as a beam #1 to a beam #4). The beam #1 causes interference to the beam #2, the beam #2 causes interference to the beam #3, the beam #3 causes interference to the beam #4, and the beam #4 causes interference to the beam #1. $PL_{12}$ is far greater than noise floor of a receiver, $PL_{23}$ is far greater than the noise floor of the receiver, $PL_{34}$ is far greater than the noise floor of the receiver, and $PL_{41}$ is far greater than the noise floor of the receiver.

For the cell #1, the network device in the cell #1 may learn that the cell #1 and the cell #2 send a beam on a same time-frequency resource, the beam #1 causes interference to the beam #2, and $PL_{12}$ is far greater than the noise floor of the receiver. In this case, the network device in the cell #1 reduces transmit power of the beam #1. For the cell #2, the network device in the cell #2 may learn that the cell #2 and the cell #3 send beams on a same time-frequency resource, the beam #2 causes interference to the beam #3, and $PL_{23}$ is far greater than the noise floor of the receiver. In this case, the network device in the cell #2 reduces transmit power of the beam #2. Other cells are similar.

Alternatively, a power reduction priority may be configured for each cell in advance. For example, power reduction priorities of the cell #1 to the cell #4 are in descending order.

For the cell #1, the network device in the cell #1 may learn that the cell #1 and the cell #2 send a beam on a same time-frequency resource. Because a power reduction priority of the cell #1 is the highest, the network device in the cell #1 reduces the transmit power of the beam #1.

For the cell #2, the network device in the cell #2 may learn that the cell #1 and the cell #2 send a beam on a same time-frequency resource. Because a power reduction priority of the cell #1 is the highest, the network device in the cell #1 reduces transmit power of the beam #1, and on this basis, the network device in the cell #2 reduces transmit power of the beam #2.

For the cell #3, the network device in the cell #3 may learn that the cell #2 and the cell #3 send a beam on a same time-frequency resource. Because a power reduction priority of the cell #2 is higher than that of the cell #3, the network device in the cell #2 reduces transmit power of the beam #2, and on this basis, the network device in the cell #3 reduces transmit power of the beam #3.

For the cell #4, the network device in the cell #4 may learn that the cell #3 and the cell #4 send a beam on a same time-frequency resource. Because a power reduction priority of the cell #3 is higher than that of the cell #4, the network device in the cell #3 reduces transmit power of the beam #3, and on this basis, the network device in the cell #4 reduces transmit power of the beam #4.

Case 2:

As shown in b in FIG. 8, five cells are used as an example. A cell #1 to a cell #5 send beams on a same time-frequency resource (beams in the five cells are respectively denoted as a beam #1 to a beam #5). The beam #1 causes interference to the beam #2, the beam #2 causes interference to the beam #3 and the beam #5, the beam #3 causes interference to the beam #4, and the beam #4 causes interference to the beam #1. $PL_{12}$ is far greater than thermal noise, $PL_{23}$ is far greater than the thermal noise, $PL_{25}$ is far greater than the thermal noise, $PL_{34}$ is far greater than the thermal noise, and $PL_{41}$ is far greater than the thermal noise.

For the cell #1, the network device in the cell #1 may learn that the cell #1 and the cell #2 send a beam on a same time-frequency resource, and $PL_{12}$ is far greater than the thermal noise. In this case, the network device in the cell #1 reduces transmit power of the beam #1.

For the cell #2, the network device in the cell #2 may learn that the cell #2, the cell #3 and the cell #5 send a beam on a same time-frequency resource, $PL_{23}$ is far greater than the thermal noise, and $PL_{25}$ is far greater than the thermal noise. In this case, the network device in the cell #2 reduces transmit power of the beam #2.

Both the cell #3 and the cell #4 are similar to the cell #1. Details are not described again.

For the cell #5, the network device in the cell #5 may learn that the cell #2 and the cell #5 send a beam on a same time-frequency resource, and $PL_{25}$ is far greater than the thermal noise. In a manner, the network device in the cell #5 reduces transmit power of the beam #5, to achieve an effect of reducing power consumption. In another manner, the network device in the cell #5 may send the beam #5 at preset power, that is, does not reduce the transmit power of the beam #5. Because the network device in the cell #2 reduces the transmit power of the beam #2, $PL_{25}$ decreases. If the network device in the cell #5 sends the beam #5 at the preset power, a rate at which the network device in the cell #5 performs downlink data transmission increases.

Case 3:

As shown in c in FIG. 8, five cells are used as an example. A cell #1 to a cell #5 send beams on a same time-frequency resource (beams in the five cells are respectively denoted as a beam #1 to a beam #5). The beam #1 causes interference to the beam #2, the beam #2 causes interference to the beam #3, the beam #3 causes interference to the beam #4, the beam #4 causes interference to the beam #1, and the beam #5 causes interference to the beam #2. $PL_{12}$ is far greater than thermal noise, $PL_{23}$ is far greater than the thermal noise, $PL_{25}$ is far greater than the thermal noise, $PL_{34}$ is far greater than the thermal noise, PLA is far greater than the thermal noise, and $PL_{52}$ is far greater than the thermal noise.

For the cell #1, the network device in the cell #1 may learn that the cell #1 and the cell #2 send a beam on a same time-frequency resource, and $PL_{12}$ is far greater than the thermal noise. In this case, the network device in the cell #1 reduces transmit power of the beam #1.

For the cell #2, the network device in the cell #2 may learn that the cell #2 and the cell #3 send a beam on a same time-frequency resource, and $PL_{23}$ is far greater than the thermal noise. In this case, the network device in the cell #2 reduces transmit power of the beam #2.

Both the cell #3 and the cell #4 are similar to the cell #1. Details are not described again.

For the cell #5, the network device in the cell #5 may learn that the cell #5 and the cell #2 send a beam on a same time-frequency resource, and $PL_{52}$ is far greater than the thermal noise. In this case, the network device in the cell #5 reduces transmit power of the beam #5.

Case 4:

As shown in d in FIG. 8, three cells are used as an example. A cell #1 to a cell #3 send beams (beams in the three cells are respectively denoted as a beam #1 to a beam #3) on a same time-frequency resource. The beam #1 causes interference to the beam #2, the beam #2 causes interference to the beam #3, and the beam #3 does not cause interference to the beam #1. $PL_{12}$ is far greater than thermal noise, and $PL_{23}$ is far greater than the thermal noise.

For the cell #1, the network device in the cell #1 may learn that the cell #1 and the cell #2 send a beam on a same time-frequency resource, and $PL_{12}$ is far greater than the thermal noise. In this case, the network device in the cell #1 reduces transmit power of the beam #1.

For the cell #2, the network device in the cell #2 may learn that the cell #2 and the cell #3 send a beam on a same time-frequency resource, and $PL_{23}$ is far greater than the thermal noise. In this case, the network device in the cell #2 reduces transmit power of the beam #2.

For the cell #3, the network device in the cell #3 may learn that the cell #2 and the cell #3 send a beam on a same time-frequency resource, and $PL_{23}$ is far greater than the thermal noise. In a manner, the network device in the cell #3 reduces transmit power of the beam #3, to achieve an effect of reducing power consumption. In another manner, the network device in the cell #3 does not reduce transmit power of the beam #3. Because the network device in the cell #2 reduces the transmit power of the beam #2, $PL_{23}$ reduces. If the network device in the cell #3 does not reduce the transmit power of the beam #3, a rate at which the network device in the cell #3 performs downlink data transmission increases.

Figure 9:
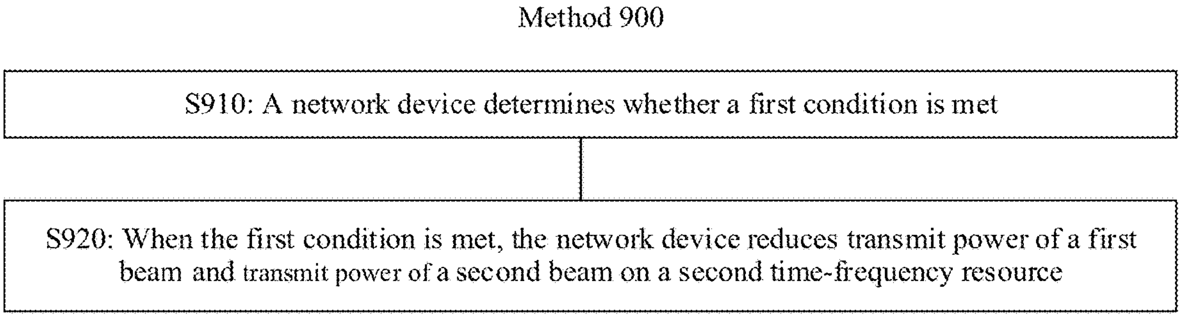
FIG. 9 is a flowchart of a method according to this application.

FIG. 9 shows a method 900 according to this application. The method 900 includes the following steps.

S910: A network device determines whether a first condition is met.

In a possible case, the first condition is that there is an overlapping second time-frequency resource between a time-frequency resource for sending a first beam and a time-frequency resource for sending a second beam, a ratio of interference of the first beam to the second beam to noise floor of a receiver is greater than a first threshold, and a ratio of interference of the second beam to the first beam to the noise floor of the receiver is greater than the first threshold.

It should be understood that the first beam corresponds to a first data stream, and the second beam corresponds to a second data stream. Therefore, the first condition may also be understood as that inter-stream interference is far greater than the noise floor of the receiver.

In another possible case, the first condition is that there is an overlapping second time-frequency resource between a time-frequency resource for sending a first beam and a time-frequency resource for sending a second beam, the interference of the first beam to the second beam is far greater than the noise floor of the receiver and interference of a neighboring cell, and the interference of the second beam to the first beam is far greater than the noise floor of the receiver and the interference of the neighboring cell. That is, the first condition may also be understood as that the inter-stream interference is far greater than a sum of the noise floor of the receiver and the interference of the neighboring cell.

According to a cause of the inter-stream interference, it is learned that the inter-stream interference is mainly related to inter-stream residual correlation and channel time-frequency correlation. The inter-stream interference can be determined by calculating the inter-stream residual correlation and the channel time-frequency correlation.

Inter-Stream Residual Correlation:

The network device needs to send a plurality of data streams, but the network device generally cannot accurately learn of downlink channel information. This is mainly determined by two factors: First, in a frequency division duplex system, the downlink channel information may be obtained by using feedback signaling at a receive end, and this causes a loss of channel information; second, due to a feedback delay, a current channel status is generally predicted based on a previous channel status, and there is a specific difference between the two channel statuses. In consideration of the two factors, residual interference exists between the plurality of data streams.

Channel Time-Frequency Correlation:

It is considered that a channel difference between different subcarriers in a same resource block group (resource block group, RBG) is large, the inter-stream interference may occur. In addition, the inter-stream interference may also occur due to channel time variation (channel aging).

It should be further understood that the first data stream and the second data stream may be different data streams of the network device for a same terminal device, or may be different data streams of the network device for different terminal devices. This is not limited.

S920: When the first condition is met, the network device reduces transmit power of the first beam and transmit power of the second beam on the second time-frequency resource.

In a manner, a reduction amplitude of the transmit power of the first beam is the same as a reduction amplitude of the transmit power of the second beam. In another manner, a reduction amplitude of the transmit power of the first beam is different from a reduction amplitude of the transmit power of the second beam.

If the reduction amplitude of the transmit power of the first beam is the same as the reduction amplitude of the transmit power of the second beam, a power reduction amplitude may be determined in the following manners.

Manner 1:

A power reduction amplitude (denoted as Δ) may be determined by using the following formula:

$$\Delta = \min(I_{12} - N, I_{21} - N),$$

where $I_{12}$ is interference of the first beam to the second beam, $I_{21}$ is interference of the second beam to the first beam, and N is noise floor of a receiver.

Manner 2:

A power reduction amplitude may be determined by using the following formula:

$$\Delta = \min(I_{12} - N - X, I_{21} - N - X),$$

where X is reserved power.

In an example, the network device sends data to UE #1 by using the first beam, and sends data to UE #2 by using the second beam. In addition, the UE #1 and the UE #2 perform multi-user (multi-user, MU) pairing on a resource block group (resource block group, RBG) #1. If the first beam and the second beam meet the first condition on the RBG #1, the network device reduces transmit power of the first beam and transmit power of the second beam on the RBG #1.

According to the solution of this application, if two beams sent by the network device meet the first condition, the network device reduces transmit power of the two beams. In this way, power consumption of the network device can be reduced, and impact on a signal to interference plus noise ratio can be reduced. This ensures communication performance of the network device.

Figure 10:
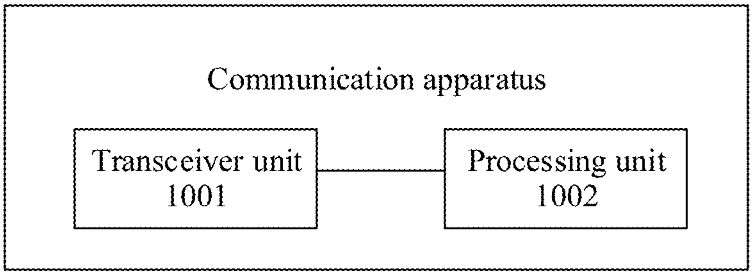
FIG. 10 is a block diagram of a communication apparatus according to this application.

According to the foregoing method, FIG. 10 is a communication apparatus according to an embodiment of this application. The communication apparatus includes a transceiver unit 1001 and a processing unit 1002.

The transceiver unit 1001 may be configured to implement a corresponding communication function. The transceiver unit 1001 may also be referred to as a communication interface or a communication unit. The processing unit 1002 may be configured to perform a processing operation.

Optionally, the apparatus further includes a storage unit. The storage unit may be configured to store instructions and/or data. The processing unit 1002 may read the instructions and/or the data in the storage unit, so that the apparatus implements actions of the apparatus in the foregoing method embodiments.

In a first design, the apparatus may be the centralized control node in the foregoing embodiment, or may be a component (for example, a chip) of the centralized control node.

The transceiver unit and the processing unit may be configured to implement related operations of the centralized control node in the foregoing method embodiments.

In a second design, the apparatus may be the first network device in the foregoing embodiments, or may be a component (for example, a chip) of the first network device.

The transceiver unit and the processing unit may be configured to implement related operations of the first network device in the foregoing method embodiments.

In a third design, the apparatus may be the second network device in the foregoing embodiments, or may be a component (for example, a chip) of the second network device.

The transceiver unit and the processing unit may be configured to implement related operations of the second network device in the foregoing method embodiments.

In a fourth design, the apparatus may be the network device in the foregoing embodiments, or may be a component (for example, a chip) of the network device.

The transceiver unit and the processing unit may be configured to implement related operations of the network device in the foregoing method embodiments.

It should be understood that a specific process in which the units perform the foregoing corresponding steps is described in detail in the foregoing method embodiments. For brevity, details are not described herein.

It should also be understood that the apparatus herein is presented in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus may be the first network element in the foregoing embodiments, and may be configured to perform the procedures and/or steps corresponding to the first network element in the foregoing method embodiments. Alternatively, the apparatus may be the network management network element in the foregoing embodiments, and may be configured to perform the procedures and/or steps corresponding to the network management network element in the foregoing method embodiments. To avoid repetition, details are not described herein again.

The foregoing communication apparatus has a function of implementing corresponding steps performed by the apparatus in the foregoing method. The function may be implemented by hardware, or may be implemented by executing corresponding software by hardware. The hardware or software includes one or more modules corresponding to the foregoing function. For example, a transceiver unit may be replaced with a transceiver (for example, a sending unit in the transceiver unit may be replaced with a transmitter, and a receiving unit in the transceiver unit may be replaced with a receiver), and another unit such as a processing unit may be replaced with a processor, to separately perform sending and receiving operations and a related processing operation in the method embodiments.

In addition, the transceiver unit 1001 may alternatively be a transceiver circuit (for example, may include a receiving circuit and a sending circuit), and the processing unit may be a processing circuit.

It should be noted that the apparatus in FIG. 10 may be the apparatus in the foregoing method embodiments, or may be a chip or a chip system, for example, a system on a chip (SoC). The transceiver unit may be an input/output circuit or a communication interface. The processing unit is a processor, a microprocessor, or an integrated circuit integrated on the chip. This is not limited herein.

Figure 11:
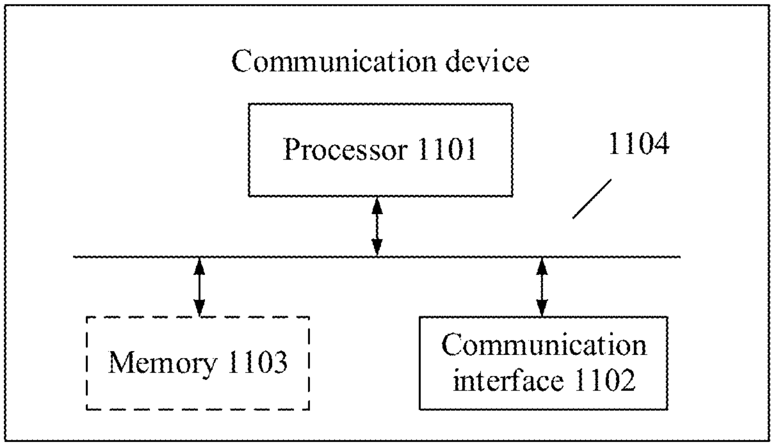
FIG. 11 is a block diagram of a communication device according to this application.

An embodiment of this application further provides a communication device. As shown in FIG. 11, the communication device includes a processor 1101 and a communication interface 1102. The processor 1101 is configured to execute a computer program or instructions stored in a memory 1103, or read data stored in the memory 1103, to perform the methods in the foregoing method embodiments. Optionally, there are one or more processors 1101. The communication interface 1102 is configured to receive and/or send a signal. For example, the processor 1101 is configured to control the communication interface 1102 to receive and/or send a signal.

Optionally, as shown in FIG. 11, the communication device further includes the memory 1103, and the memory 1103 is configured to store a computer program or instructions and/or data. The memory 1103 may be integrated with the processor 1101, or may be disposed separately. Optionally, there are one or more memories 1103.

Optionally, the processor 1101, the communication interface 1102, and the memory 1103 are connected to each other through a bus 1104. The bus 1104 may be a peripheral component interconnect (PCI) bus, an extended industry standard architecture (EISA) bus, or the like. The bus 1104 may be classified into an address bus, a data bus, a control bus, and the like. For ease of representation, only one bold line is used to represent the bus in FIG. 11, but this does not mean that there is only one bus or only one type of bus.

For example, the processor 1101 is configured to execute the computer program or the instructions stored in the memory 1103, to implement related operations of the network device in the foregoing method embodiments.

For another example, the processor 1101 is configured to execute the computer program or the instructions stored in the memory 1103, to implement related operations of the centralized control node in the foregoing method embodiments.

It should be understood that a processor (like the processor 1101) mentioned in embodiments of this application may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic logic array (GAL), or any combination thereof.

It may be further understood that a memory (like a memory 1103) mentioned in embodiments of this application may be a volatile memory or a non-volatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technologies, or some of the technical solutions may be implemented in a form of a software product. The software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A power control method performed by a first network device, comprising:

sending first information to a second network device, where the first information indicates a time-frequency resource used by the first network device to send a first beam;

receiving second information from the second network device, where the second information indicates a time-frequency resource used by the second network device to send a second beam;

determining, based on the first information and the second information, that there is an overlapping first time-frequency resource between the time-frequency resource for sending the first beam and the time-frequency resource for sending the second beam, a ratio of interference of the first beam to the second beam to noise floor of a receiver is greater than a first threshold, and a ratio of interference of the second beam to the first beam to the noise floor of the receiver is greater than the first threshold; and in response to the determination, reducing transmit power of the first beam on the overlapping first time-frequency resource.

2. The method of claim 1, the method further comprising:

receiving third information from a fourth network device, wherein the third information indicates a time-frequency resource used by the fourth network device to send a fourth beam, the second beam causes first interference to the first beam, the fourth beam causes second interference to the first beam, a ratio of interference of the first beam to the fourth beam to noise floor of a receiver is less than or equal to the first threshold; and wherein a ratio of interference of the second beam to the first beam to the noise floor of the receiver is greater than the first threshold, includes:

a ratio of the first interference to a sum of the noise floor of the receiver and the second interference is greater than the first threshold.

3. The method of claim 1, wherein the time-frequency resource for sending the first beam includes a first time domain and a first proportion occupying a specific frequency domain, and the time-frequency resource for sending the second beam includes a second time domain and a second proportion occupying a specific frequency domain; and the determining that there is the overlapping first time-frequency resource comprises:

determining that the first time domain and the second time domain overlap with each other, and both the first proportion and the second proportion are greater than a fourth threshold.

4. A power control method performed by a first network device, the method comprising:

reducing beam transmit power;

sending first information to a second network device, wherein the first information indicates a time-frequency resource used by the first network device to send a first beam;

receiving second information from the second network device, where the second information indicates a time-frequency resource used by the second network device to send a second beam;

determining, based on the first information and the second information, that there is an overlapping first time-frequency resource between the time-frequency resource for sending the first beam and the time-frequency resource for sending the second beam, a ratio of interference of the first beam to the second beam to noise floor of a receiver is greater than a first threshold, and a ratio of interference of the second beam to the first beam to the noise floor of the receiver is greater than the first threshold; and in response to the determination, increasing transmit power of the first beam.

5. The method of claim 4, the method further comprising:

receiving third information from a fourth network device, wherein the third information indicates a time-frequency resource used by the fourth network device to send a fourth beam, the second beam causes first interference to the first beam, the fourth beam causes second interference to the first beam, a ratio of interference of the first beam to the fourth beam to noise floor of a receiver is less than or equal to the first threshold; and wherein a ratio of interference of the second beam to the first beam to the noise floor of the receiver is greater than the first threshold, includes:

a ratio of the first interference to a sum of the noise floor of the receiver and the second interference is greater than the first threshold.

6. The method of claim 4, wherein the time-frequency resource for sending the first beam includes a first time domain and a first proportion occupying a specific frequency domain, and the time-frequency resource for sending the second beam includes a second time domain and a second proportion occupying a specific frequency domain; and the determining that there is the overlapping first time-frequency resource comprises:

determining that the first time domain and the second time domain overlap with each other, and both the first proportion and the second proportion are greater than a fourth threshold.

7. A power control method, comprising:

determining whether a first condition is met, wherein the first condition comprises that a time-frequency resource for sending a first beam and a time-frequency resource for sending a second beam overlap, a ratio of interference of the first beam to the second beam to noise floor of a receiver is greater than a first threshold, and a ratio of interference of the second beam to the first beam to the noise floor of the receiver is greater than the first threshold; and reducing transmit power of the first beam and transmit power of the second beam when the first condition is met.

8. The method of claim 7, the method further comprising:

determining whether a second condition is met, wherein the second condition comprises that the time-frequency resource for sending the first beam and a time-frequency resource for sending a third beam overlap, and a ratio of interference of the first beam to the third beam to the noise floor of the receiver is greater than the first threshold; and reducing transmit power of the third beam when the second condition is met.

9. The method of claim 8, wherein the method is applicable to a system comprising a first network device, a second network device, and a third network device, the first network device is configured to send the first beam, the second network device is configured to send the second beam, and the third network device is configured to send the third beam.

10. The method of claim 9, wherein the determining whether the first condition is met comprises:

determining, by the first network device and the second network device, whether the first condition is met; and the reducing the transmit power of the first beam and the transmit power of the second beam when the first condition is met comprises:

when the first condition is met, reducing, by the first network device, the transmit power of the first beam, and reducing, by the second network device, the transmit power of the second beam.

11. The method of claim 10, wherein the determining, by the first network device and the second network device, whether the first condition is met comprises:

sending, by the first network device, first information to the second network device, wherein the first information comprises the time-frequency resource used by the first network device to send the first beam, and the interference of the second beam to the first beam;

sending, by the second network device, second information to the first network device, wherein the second information comprises the time-frequency resource used by the second network device to send the second beam, and the interference of the first beam to the second beam; and determining, by the first network device and the second network device based on the first information and the second information, whether the first condition is met.

12. The method of claim 9, wherein the determining whether the second condition is met comprises:

determining, by the third network device, whether the second condition is met; and the reducing transmit power of the third beam when the second condition is met comprises:

when the second condition is met, reducing, by the third network device, the transmit power of the third beam.

13. The method of claim 8, wherein the method is applicable to a system comprising a centralized control node, a first network device, a second network device, and a third network device, the centralized control node is configured to manage the first network device, the second network device, and the third network device, the first network device is configured to send the first beam, the second network device is configured to send the second beam, and the third network device is configured to send the third beam.

14. The method of claim 13, wherein the determining whether the first condition is met comprises:

determining, by the centralized control node, whether the first condition is met; and the reducing transmit power of the first beam and transmit power of the second beam when the first condition is met comprises:

when the first condition is met, sending, by the centralized control node, first indication information to the first network device, and sending second indication information to the second network device, wherein the first indication information indicates to reduce the transmit power of the first beam, and the second indication information indicates to reduce the transmit power of the second beam.

15. The method of claim 13, wherein the determining whether the second condition is met comprises:

determining, by the centralized control node, whether the second condition is met; and the reducing the transmit power of the third beam when the second condition is met comprises:

when the second condition is met, sending, by the centralized control node, third indication information to the third network device, wherein the third indication information indicates to reduce the transmit power of the third beam.

16. The method of claim 7, wherein a reduction amplitude of the transmit power of the first beam is the same as a reduction amplitude of the transmit power of the second beam.

* * * * *